US012037818B2

United States Patent
Okawa et al.

(10) Patent No.: US 12,037,818 B2
(45) Date of Patent: Jul. 16, 2024

(54) DOOR LATCH DEVICE

(71) Applicant: MITSUI KINZOKU ACT CORPORATION, Kanagawa (JP)

(72) Inventors: Shintaro Okawa, Kanagawa (JP); Yasuyuki Watanabe, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 260 days.

(21) Appl. No.: 17/459,795

(22) Filed: Aug. 27, 2021

(65) Prior Publication Data

US 2022/0025678 A1  Jan. 27, 2022

Related U.S. Application Data

(63) Continuation of application No. PCT/JP2020/018060, filed on Apr. 28, 2020.

(30) Foreign Application Priority Data

| Jul. 31, 2019 | (JP) | 2019-141667 |
| Oct. 21, 2019 | (JP) | 2019-191955 |
| Oct. 25, 2019 | (WO) | PCT/JP2019/041979 |

(51) Int. Cl.
*E05B 77/34* (2014.01)
*E05B 79/04* (2014.01)
(Continued)

(52) U.S. Cl.
CPC .............. *E05B 77/34* (2013.01); *E05B 79/04* (2013.01); *E05B 81/06* (2013.01); *E05B 81/54* (2013.01);
(Continued)

(58) Field of Classification Search
CPC .......... E05B 77/34; E05B 79/04; E05B 85/02; E05B 81/06; E05B 81/16; E05B 81/42; E05B 81/54; B60J 5/04
See application file for complete search history.

(56) References Cited

U.S. PATENT DOCUMENTS

| 9,551,172 B2 | 1/2017 | Barmscheidt et al. |
| 10,329,807 B2 | 6/2019 | Margheritti et al. |
(Continued)

FOREIGN PATENT DOCUMENTS

| CN | 103841783 A | * | 6/2014 | ............. E05B 77/34 |
| CN | 103841783 A | | 6/2014 | |
(Continued)

OTHER PUBLICATIONS

Machine translation for CN 103841783 A (Year: 2014).*
(Continued)

*Primary Examiner* — Christine M Mills
*Assistant Examiner* — Christopher F Callahan
(74) *Attorney, Agent, or Firm* — Rimon P.C.

(57) ABSTRACT

A door latch device includes: electric components; a machine mechanism; a circuit board; a case; a first cover forming a first housing space in which a motor and the machine mechanism are housed; a second cover forming a second housing space in which the circuit board is housed; and an external waterproof seal disposed between the case and the second cover and waterproofs the second housing space. Further, the case includes: a recessed part forming a part of the second housing space; a surrounding wall surrounding the recessed part; and a seal groove formed along an outer circumference of the surrounding wall and in which the external waterproof seal is disposed, the second housing space is formed by covering the recessed part by the second cover, and an entire circumference between the recessed part
(Continued)

and the second cover is waterproofed by the external waterproof seal.

13 Claims, 14 Drawing Sheets

(51) Int. Cl.
    *E05B 81/06*     (2014.01)
    *E05B 81/54*     (2014.01)
    *E05B 85/02*     (2014.01)
    *B60J 5/04*     (2006.01)
    *E05B 81/16*     (2014.01)
    *E05B 81/42*     (2014.01)

(52) U.S. Cl.
    CPC ............... *E05B 85/02* (2013.01); *B60J 5/04* (2013.01); *E05B 81/16* (2013.01); *E05B 81/42* (2013.01)

(56) References Cited

U.S. PATENT DOCUMENTS

| | | | | |
|---|---|---|---|---|
| 2003/0137202 A1* | 7/2003 | Mao | ............... | H02K 11/215 310/68 B |
| 2011/0211311 A1* | 9/2011 | Shinoda | ............... | H05K 5/0213 361/694 |
| 2015/0361694 A1* | 12/2015 | Zeabari | ............... | E05B 81/54 361/752 |
| 2016/0042889 A1* | 2/2016 | Satou | ............... | H01H 13/14 200/293 |
| 2016/0230426 A1 | 8/2016 | Taurasi et al. | | |
| 2020/0165843 A1* | 5/2020 | Michetti | ............... | E05B 77/34 |

FOREIGN PATENT DOCUMENTS

| | | | | |
|---|---|---|---|---|
| CN | 208691641 U | 4/2019 | | |
| JP | 6213927 B2 | 10/2017 | | |
| JP | 6482537 B2 | 3/2019 | | |
| WO | WO-2011147593 A1 * | 12/2011 | ............ | B60K 15/05 |
| WO | WO-2015044323 A1 * | 4/2015 | ............ | E05B 77/34 |

OTHER PUBLICATIONS

International Search Report issued in corresponding International Patent Application No. PCT/JP2020/018060, dated Jul. 21, 2020, with English translation.

\* cited by examiner

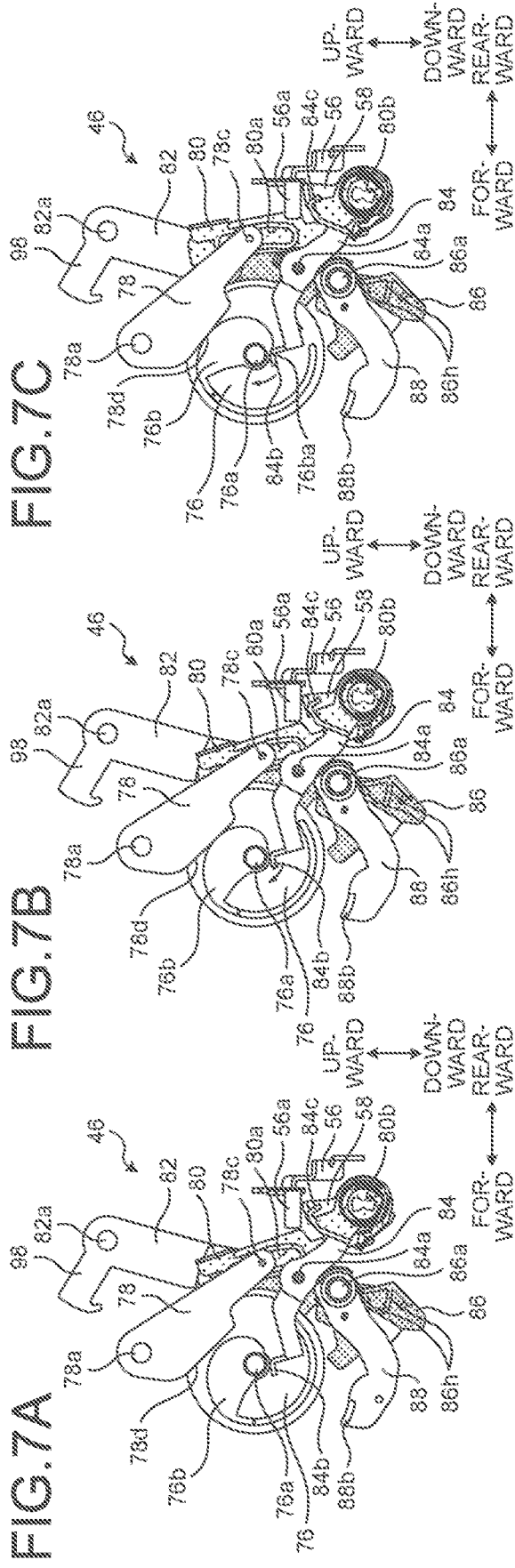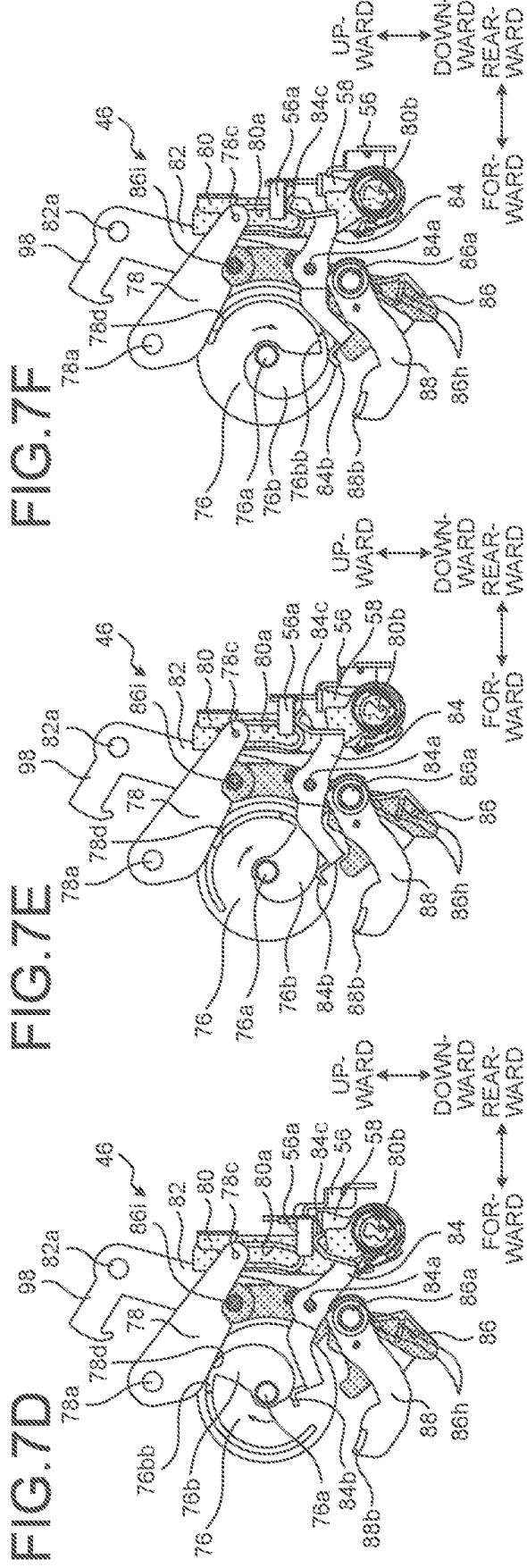

DOOR LATCH DEVICE

CROSS-REFERENCE TO RELATED APPLICATION(S)

This application is a continuation of International Application No. PCT/JP2020/018060, filed on Apr. 28, 2020 which claims the benefit of priority of Japanese Patent Application No. 2019-141667, filed on Jul. 31, 2019, Japanese Patent Application No. 2019-191955, filed on Oct. 21, 2019, and International Application No. PCT/JP2019/041979, filed on Oct. 25, 2019, the entire contents of which are incorporated herein by reference.

BACKGROUND

The present disclosure relates to a door latch device for closing and opening a vehicle door.

A door latch device of a vehicle includes a latch mechanism that latches and unlatches a striker disposed on a main body side of the vehicle, and closes and opens a door by the latch mechanism.

Japanese Patent No. 6213927 discloses a door latch device including an electric release mechanism that can release engagement between a latch mechanism and a striker by power of a motor, a manual release mechanism that can release engagement of the latch mechanism by manual operation force, and a lock mechanism that can switch between a locked state that disables a release function of the manual release mechanism and an unlocked state that enables the same.

In this door latch device, engagement of the latch mechanism is released exclusively by the electric release mechanism, and the manual release mechanism is disposed as a complement for a case in which the function of the electric release mechanism is disabled due to an accident, a fault in an electrical system, a voltage drop of a battery, and the like. Thus, the lock mechanism is used only for the function of the manual release mechanism, and is always used in the locked state and switched to the unlocked state for a predetermined situation.

In this door latch device, the locked state and the unlocked state of the lock mechanism are switched by normal rotation and reverse rotation of a cam wheel rotated by power of the motor. The cam wheel is held at a reference position by energizing force of a neutral return spring, and has a configuration for switching the lock mechanism to the locked state when normally rotated from the reference position, and switching the lock mechanism to the unlocked state when reversely rotated from the reference position.

Additionally, the cam wheel also releases engagement of the latch mechanism when normally rotated from the reference position. Due to this, the lock mechanism can be switched, and the engagement of the latch mechanism can be released by a single motor.

On the other hand, some door latch devices for closing and opening the vehicle door include electric components such as a motor and a position switch. The motor is used, for example, for an automatic lock function, a transition from a half latch state to a full latch state, and the like depending on specifications. The motor is controlled by a predetermined circuit board based on the position switch or another signal.

The door latch device including the electric components has a dripproof structure, for example. On the other hand, the circuit board requires a higher waterproof property than that of the electric components such as the motor, so that the circuit board is often housed in a waterproof ECU that is disposed separately from the door latch device.

However, when the waterproof ECU is disposed separately from the door latch device, the number of components is increased corresponding thereto, and the number of steps for mounting the components on the vehicle is increased accordingly. Additionally, a harness between the door latch device and the waterproof ECU, and a connecting step therefor are required.

Thus, in Japanese Patent No. 6482537, the circuit board that controls the motor is disposed inside the door latch device. In this door latch device, a space in which the circuit board is housed and a space in which a mechanism part is housed are partitioned with a partition wall. The space in which the circuit board is disposed is covered by a predetermined cover, and waterproofed with a first seal with respect to an external space. A pin is erected from the circuit board, and projects to the space of the mechanism part through a hole disposed on the partition wall. A second seal having a ring shape is disposed between the hole of the partition wall and the circuit board, and the second seal abuts on the periphery of the pin on a surface of the circuit board to achieve waterproofing.

SUMMARY

There is a need for providing a door latch device that can improve a waterproof property.

According to an embodiment, a door latch device that is disposed on a door of a vehicle to latch and unlatch a striker disposed on a main body side of the vehicle to close and open the door, includes: electric components including a motor; a machine mechanism configured to be driven by the motor; a circuit board electrically connected to the electric components; a case; a first cover forming a first housing space in which the motor and the machine mechanism are housed by covering one surface of the case; a second cover forming a second housing space in which the circuit board is housed by covering another surface of the case; and an external waterproof seal that is disposed between the case and the second cover, and waterproofs the second housing space against outside. Further, the case includes: a recessed part forming a part of the second housing space; a surrounding wall surrounding the recessed part; and a seal groove formed along an outer circumference of the surrounding wall and in which the external waterproof seal is disposed, the second housing space is formed by covering the recessed part by the second cover, and an entire circumference between the recessed part and the second cover is waterproofed by the external waterproof seal.

BRIEF DESCRIPTION OF DRAWINGS

FIG. 7A is a diagram illustrating a basic state in which the cam wheel is at a reference position;

FIG. 7B is a diagram illustrating a state in which the cam wheel normally and slightly rotates from the reference position;

FIG. 7C is a diagram illustrating a state in which the cam wheel normally rotates from the reference position by about 40°;

FIG. 7D is a diagram illustrating a state in which the cam wheel normally rotates from the reference position by about 90°;

FIG. 7E is a diagram illustrating a state in which the cam wheel normally rotates from the reference position by about 190°;

FIG. 7F is a diagram illustrating a state in which the cam wheel normally rotates from the reference position by about 250°;

DETAILED DESCRIPTION

Figure 1:
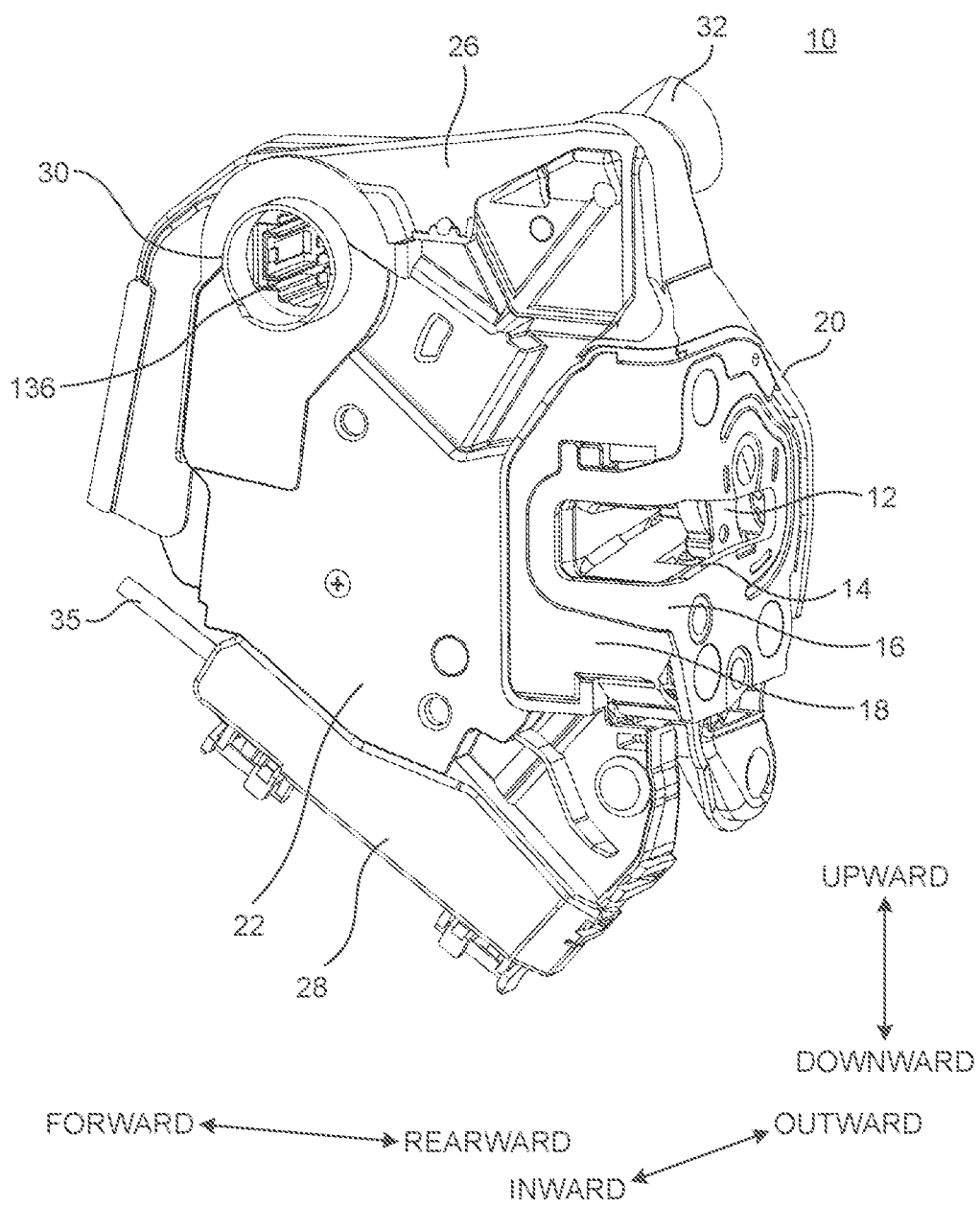
FIG. 1 is a perspective view of a door latch device according to an embodiment viewed from obliquely rearward on the outside of a vehicle.

In the door latch device disclosed in Japanese Patent No. 6213927 of what is called a knob-less type not including a locking/unlocking knob for manually switching the lock mechanism, manual switching to an unlocked state using a key and switching to the unlocked state by power of the motor are not required to be used unless a predetermined situation is caused. Thus, the lock mechanism does not work by a normal operation, and is maintained in the locked state for a long time. As a result, there is the concern that grease is hardened due to long-term deterioration, or a spring, a lever, and the like made of steel material rust, and the lock mechanism does not smoothly function in a predetermined situation. Thus, there is a demand for a door latch device in which the lock mechanism smoothly functions in a predetermined situation.

In the door latch device disclosed in Japanese Patent No. 6213927, the lock mechanism is switched from the unlocked state to the locked state on the condition that engagement of the latch mechanism is released, so that the lock mechanism cannot be singly switched from the unlocked state to the locked state without releasing engagement of the latch mechanism by a single motor. Thus, there is a demand for a door latch device that can release engagement of the latch mechanism and switch the lock mechanism to the locked state and the unlocked state by a single motor. At this point, it is preferable that unnecessary sound that bothers a user is not generated.

On the other hand, in the door latch device disclosed in Japanese Patent No. 6482537, force is applied to the pin disposed on the circuit board due to connection with the motor and the like, so that the pin requires fixing strength with respect to the circuit board, is an irregular type including a plurality of solder legs, and requires a wide area corresponding thereto. A range surrounded by the second seal is not waterproofed on the surface of the circuit board, so that a soldered portion of a base of the pin is also not waterproofed, and there is concern about durability. Furthermore, a through hole or a pattern cannot be disposed in this non-waterproofed range. In this way, with the door latch device disclosed in Japanese Patent No. 6482537, a sufficient waterproof property cannot be obtained, so that there is a constraint on arrangement of components and the like.

In the door latch device disclosed in U.S. Pat. No. 10,329,807, a space in which the circuit board is housed is not sufficiently waterproofed, so that there is the concern that water may enter the space.

The following describes an embodiment of a door latch device according to the present disclosure in detail based on the drawings. The present disclosure is not limited to the embodiment.

In the following description, representation of directions in the description of a door latch device 10 is based on the vehicle. As the directions based on the vehicle, upward and downward, inward and outward (that is, an indoor side and an outdoor side), and forward and rearward are indicated by arrows when appropriate in the drawings. Representation of a rotation direction (a clockwise direction, a counterclockwise direction) of a rotary component basically corresponds to the drawing that is referred to at the present point. The door latch device 10 exemplified in each of the drawings is a door latch device applied to a right side door of the vehicle, but a door latch device applied to a left side door may have a symmetrical structure.

Figure 2:
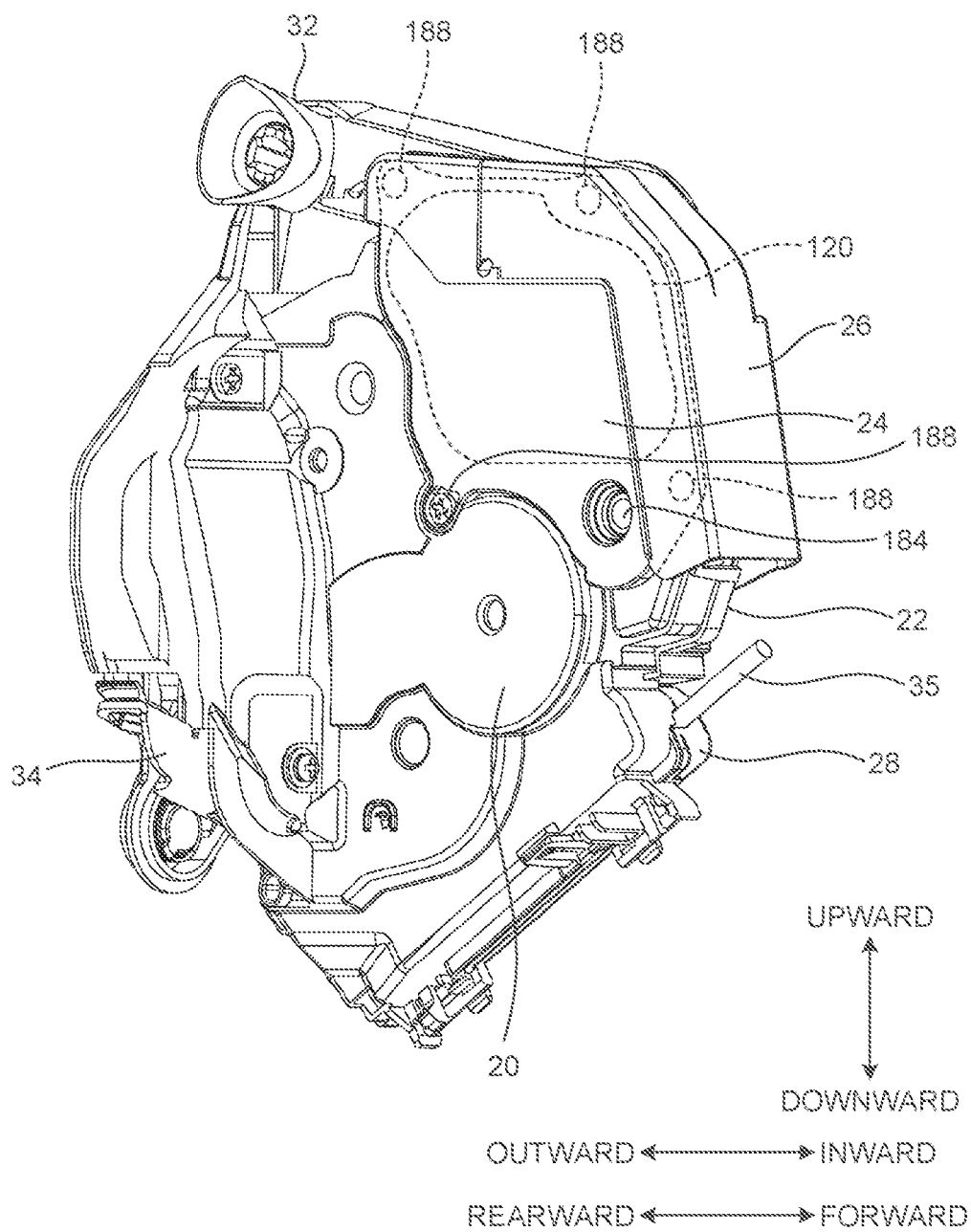
FIG. 2 is a perspective view of the door latch device viewed from obliquely forward on the outside of the vehicle.

FIG. 1 is a perspective view of the door latch device 10 according to the present embodiment viewed from obliquely rearward, and FIG. 2 is a perspective view of the door latch device 10 viewed from obliquely forward on the outside of the vehicle.

The door latch device 10 is attached to an inner part of the door of the vehicle, and closes and opens the door by latching and unlatching a striker disposed on a main body side of the vehicle. For example, the door latch device 10 is disposed to latch the striker on a side door of the vehicle, but the "door" has a broad sense, and may be applied to a hood, a trunk lid, a tail gate and the like. First, the following describes a schematic entire configuration of the door latch device 10.

As illustrated in FIG. 1 and FIG. 2, in the door latch device 10, a latch 12 that latches the striker is disposed at the back of a striker entry groove 14. The latch 12 is part of a latch mechanism 44 described later. The striker entry groove 14 is formed as part of a cover plate 16. A body 18 is disposed around the cover plate 16. An inner side and a rear side of the latch mechanism 44 are covered by the cover plate 16 and the body 18.

The door latch device 10 is covered by a case 20, a first cover 22, and a second cover 24 in addition to the cover plate 16 and the body 18 described above. The case 20 mainly covers an outer side, the first cover 22 mainly covers an inner side, and the second cover 24 further covers a forward upper part of the inner side of the case 20. The cover plate 16, the body 18, the case 20, the first cover 22, and the second cover 24 form a housing of the door latch device 10.

The door latch device 10 further includes a waterproof cover 26 that covers an upper surface, a cable cover 28 on an inner lower side, a coupler 30 disposed on an inner upper part, and a key cylinder coupling part 32 disposed on an outer upper part. The waterproof cover 26 covers a boundary part between the case 20 and the first cover 22, and the second cover 24 from above to prevent entry of waterdrops. The cable cover 28 covers a connecting portion for a cable 35. The cable 35 is connected to an inner handle (not illustrated). A harness connector (not illustrated) is connected to the coupler 30. A sponge may be disposed around the coupler 30. The key cylinder coupling part 32 is a portion into which a key is inserted to be operated. An end part of an outer lever 34 connected to an outer handle (not illustrated) is exposed to an outer surface of the door latch device 10.

Figure 3:
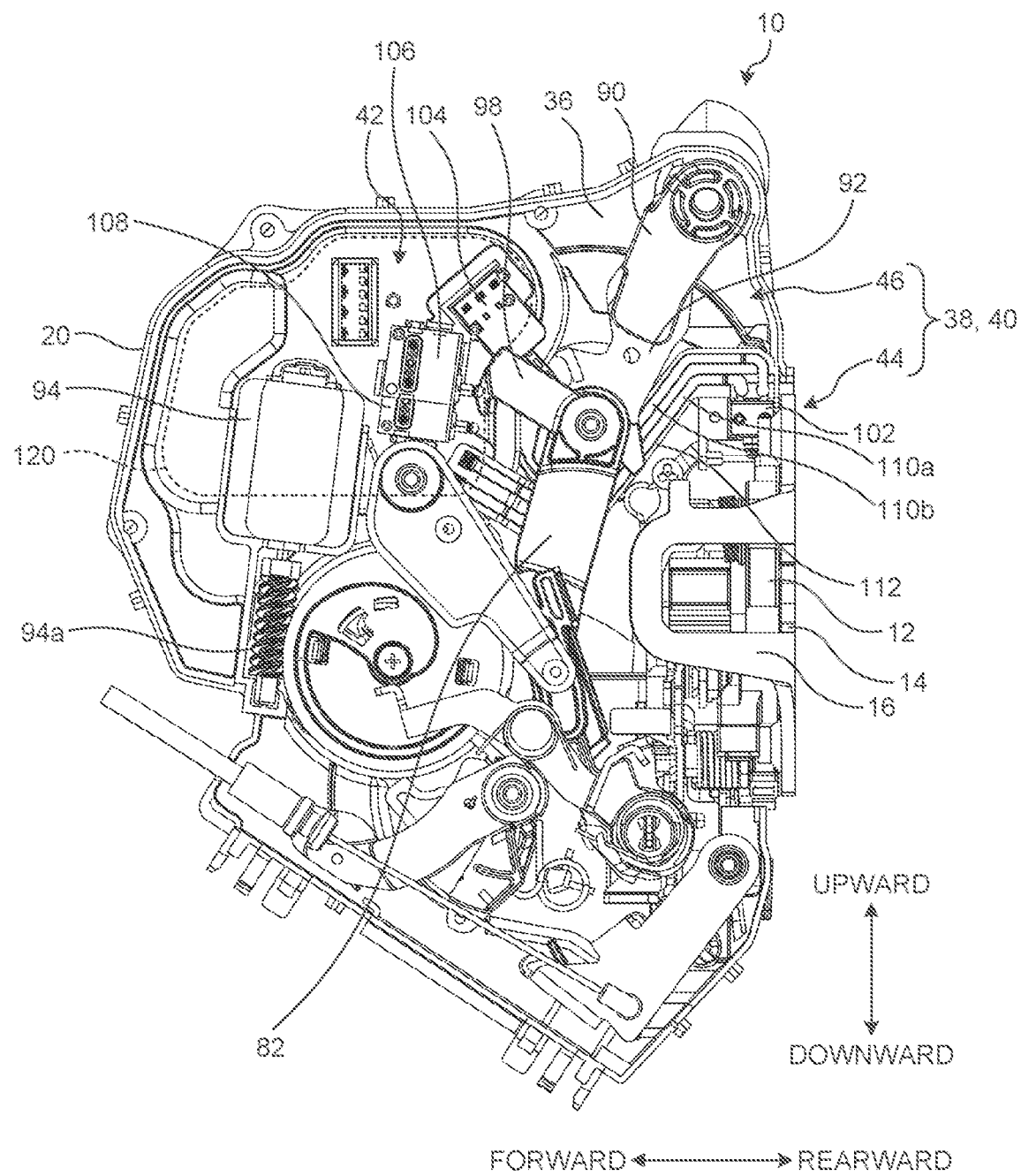
FIG. 3 is a side view illustrating an inner part of the door latch device.

FIG. 3 is a side view illustrating an inner part of the door latch device 10. FIG. 3 illustrates the door latch device 10 in a state in which the body 18, the first cover 22, the waterproof cover 26, and the cable cover 28 are removed.

As illustrated in FIG. 3, a first housing space 36 is formed inside the door latch device 10. The first housing space 36 is a region the outer side of which is covered by the case 20, and the inner side thereof is mainly covered by the first cover 22. The inner side of the first housing space 36 is covered by the cover plate 16, the body 18, and the cable cover 28 in addition to the first cover 22.

The first housing space 36 can be briefly partitioned into a mechanism region 40 in which a machine mechanism 38 is disposed, and an electric component region 42 in which electric components are disposed. The electric component region 42 occupies a forward upper part, and the mechanism region 40 occupies a remaining portion. The machine mechanism 38 includes the latch mechanism 44 that latches and unlatches the striker with the latch 12, and a lock mechanism 46 that causes the latch mechanism 44 to be in a locked state and an unlocked state. The latch mechanism 44 is disposed rearward in the first housing space 36, and covered by the cover plate 16 and the body 18. In the door latch device 10, a second housing space 124 (refer to FIG. 10) is formed in addition to the first housing space 36. The second housing space 124 will be described later.

The machine mechanism 38 also includes an electric release unit that can release the latch mechanism 44 by power of a motor 94, and a manual release unit that can release the latch mechanism 44 by manual operation force. The electric release unit is a unit that includes the motor 94, a cam wheel 76 and the like (described later), and unlatches the striker. The manual release unit is a unit that unlatches the striker via the outer lever 34 that mechanically interlocks with a manual operation and an inner lever 59 (described later).

Figure 4:
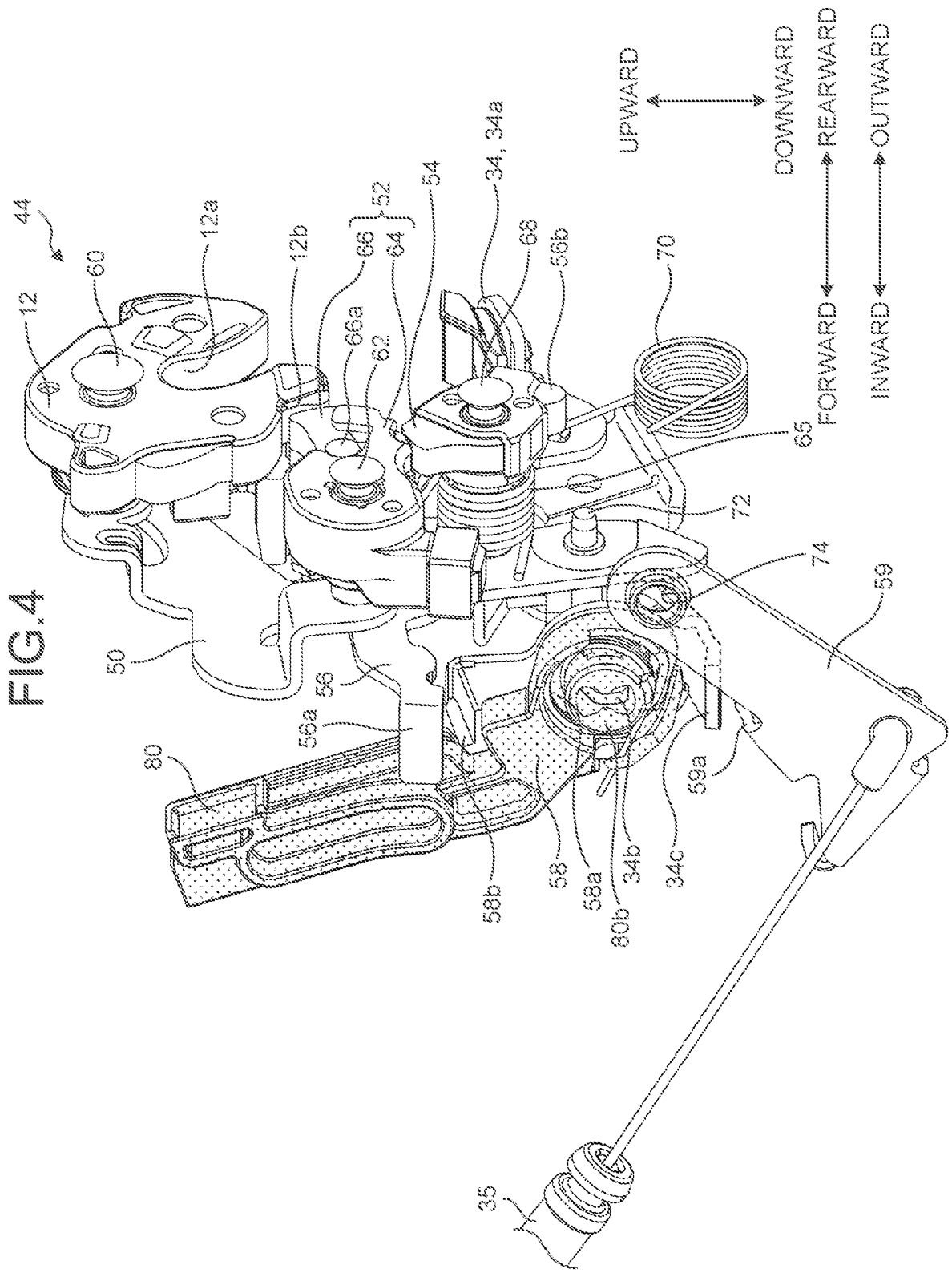
FIG. 4 is a perspective view of a latch mechanism.

FIG. 4 is a perspective view of the latch mechanism 44. As illustrated in FIG. 4, the latch mechanism 44 includes a base bracket 50, a ratchet 52, a ratchet holder 54, a ratchet lever 56, an anti-panic lever 58, and the inner lever 59 in addition to the latch 12 and the outer lever 34 described above. Each element of the latch mechanism 44 is supported or pivotally supported by the base bracket 50.

The latch 12 is pivotally supported by a shaft part 60, and includes a striker engagement groove 12a and a ratchet engagement part 12b. The latch 12 rotates against a spring (not illustrated) when the striker enters the striker engagement groove 12a from a door-opened state, latches the striker at a full-latch position when the ratchet 52 engages with the ratchet engagement part 12b, and closes the door.

The ratchet 52 includes a base lever 64 pivotally supported by a shaft part 62, and a pole lever 66 with a base shaft part 66a pivotally supported to the base lever 64. The base lever 64 is elastically energized by a spring 65. The pole lever 66 bends within a predetermined angle range with respect to the base lever 64. The ratchet 52 is supported by the ratchet holder 54 from a side to hold a substantially linear attitude of the ratchet 52, and a distal end of the pole lever 66 engages with the ratchet engagement part 12b to hold the latch 12 at the full-latch position.

The ratchet holder 54 is pivotally supported by a shaft part 68, and elastically energized by a spring 70 to laterally support the base lever 64. The ratchet holder 54 rotates against elastic force of the spring 70 based on an operation of the ratchet lever 56, and is separated from the base lever 64. The base lever 64 and the pole lever 66 of the ratchet 52 are then caused to be in a buckling state with respect to the base shaft part 66a, and the pole lever 66 is detached from the ratchet engagement part 12b to open the latch 12. The latch 12 rotates by elastic force to unlatch the striker, and opens the door. By operating the ratchet 52 via the ratchet holder 54, the operation is enabled to be performed by lighter force as compared with a case of directly operating the ratchet 52.

The ratchet lever 56 is pivotally supported by the base bracket 50, and includes a passive part 56a projecting inward from a rotor shaft, and an action part 56b projecting outward from the rotor shaft. In the ratchet lever 56, the action part 56b rotates the ratchet holder 54 by moving the passive part 56a upward.

The outer lever 34 is pivotally supported by a shaft part 72, and includes a handle operation part 34a projecting outward from the shaft part 72, and an action part 34b and a lever passive piece 34c projecting inward from the shaft part 72. The handle operation part 34a is a portion operated by the outer handle. The action part 34b is inserted into a hole 58a of the anti-panic lever 58, and acts on the anti-panic lever 58. The action part 34b is also inserted into a deformed hole 80b of an open link 80 (described later). The lever passive piece 34c is disposed below the action part 34b, and operated by the inner lever 59. The outer lever 34 is rotated by an operation of the handle operation part 34a or the lever passive piece 34c, and pushes up the anti-panic lever 58.

The inner lever 59 is pivotally supported by a shaft part 74, and is swung when the cable 35 is operated, whereby an operation piece 59a pushes up the lever passive piece 34c.

The anti-panic lever 58 includes the hole 58a into which the action part 34b is inserted, and an action piece 58b bent at an upper part. The anti-panic lever 58 is pushed up by the action part 34b due to rotation of the outer lever 34 when the open link 80 (described later) is at an unlocked position, and the action piece 58b pushes up the passive part 56a of the ratchet lever 56. Due to this, the ratchet holder 54 and the ratchet 52 perform an unlatch operation. The anti-panic lever 58 has a structure separated from the open link 80 for an anti-panic mechanism.

Figure 5:
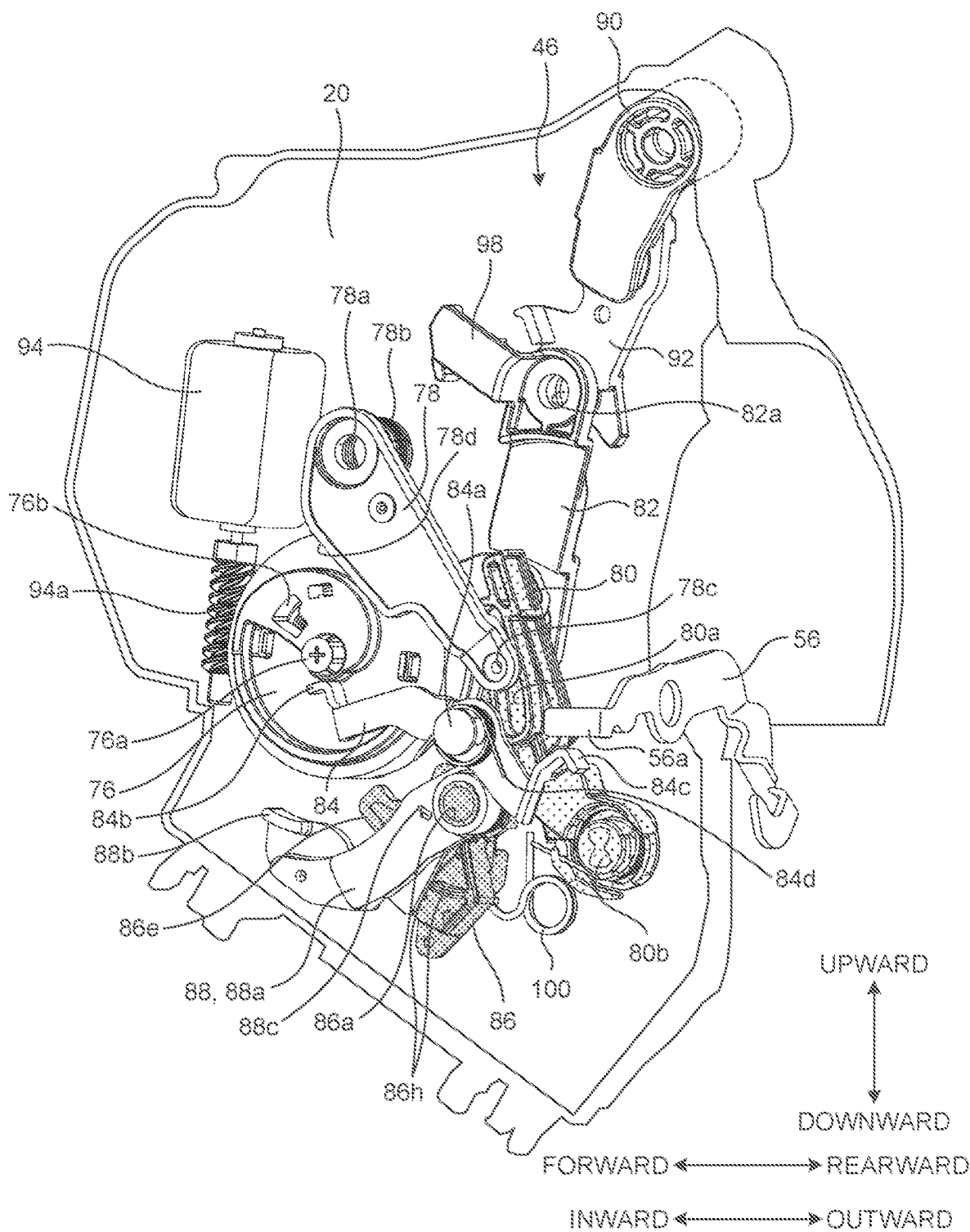
FIG. 5 is a perspective view of the lock mechanism viewed from obliquely inside rearward.
Figure 6:
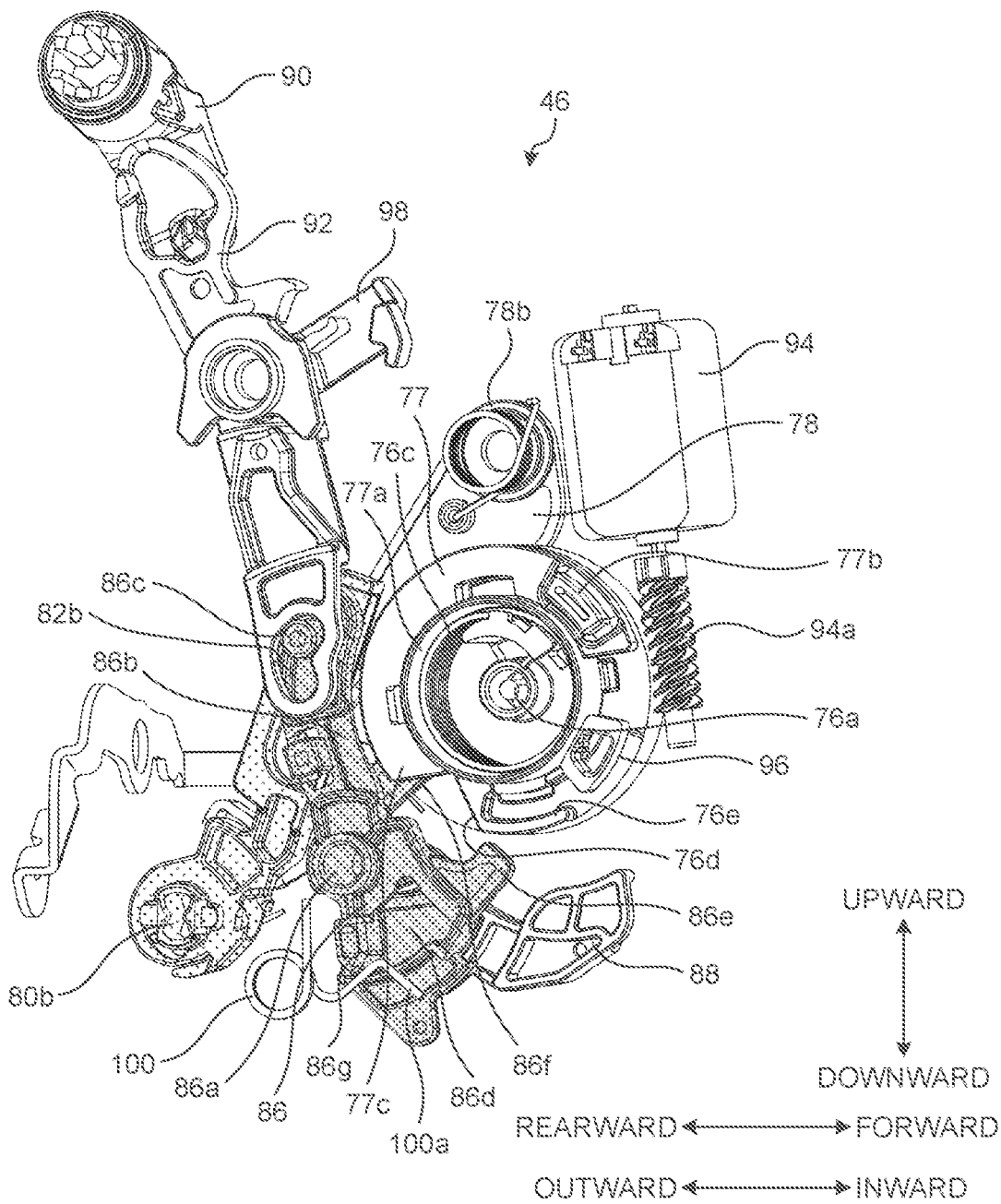
FIG. 6 is a perspective view of the lock mechanism viewed from obliquely outside forward.

FIG. 5 is a perspective view of the lock mechanism 46 viewed from obliquely inside rearward, and FIG. 6 is a perspective view of the lock mechanism 46 viewed from obliquely outside forward. In FIG. 5, the case 20 is also briefly illustrated so that arrangement of the lock mechanism 46 can be understood. In FIG. 5 and FIG. 6, the lock mechanism 46 is in the locked state.

As illustrated in FIG. 5 and FIG. 6, the lock mechanism 46 includes the cam wheel 76 pivotally supported by a shaft part 76a, a cam lever 78 that is pivotally supported by a shaft part 78a and driven by the cam wheel 76, the open link (position switching member) 80 driven by the cam lever 78, a sub-lock lever 82 interlocking with the open link 80, and an open lever 84 that is pivotally supported by a shaft part 84a and driven by the cam wheel 76. The lock mechanism 46 further includes a lock lever 86 and an auxiliary lever 88 interlocking with the sub-lock lever 82, and a key lever 90 and a sub-key lever 92 that interlock with a key operation to drive the sub-lock lever 82. For facilitating identification of components in each drawing, the lock lever 86 is represented by a dark dot pattern, and the open link 80 is represented by a light dot pattern.

The cam wheel 76 has a disk shape, and rotates when teeth disposed on an outer peripheral surface are driven by a worm 94a of a rotor shaft of the motor 94. The teeth are not illustrated. The motor 94 is disposed in the electric component region 42 (refer to FIG. 3). A rotation direction of the cam wheel 76 is represented such that a clockwise direction indicates normal rotation, and a counterclockwise direction indicates reverse rotation based on FIG. 5.

The cam wheel 76 includes a cam 76b. The cam 76b has a shape having a diameter that gradually increases, from immediately below the shaft part 76a in the counterclockwise direction across about 270°, when the cam wheel 76 is at a reference position. The diameter thereof is close to a radius of the cam wheel 76 at a position of about 270°, and the diameter is maintained in the counterclockwise direction to a position of about 180°.

As illustrated in FIG. 6, an auxiliary component 77 is disposed on an inner surface of the cam wheel 76. The cam wheel 76 and the auxiliary component 77 are fixed to be substantially one component. A spring 76c is disposed inside a sleeve 77a formed of the auxiliary component 77. The spring 76c energizes the cam wheel 76 to be at a neutral reference position. The cam wheel 76 can normally rotate and reversely rotate against the spring 76c from the reference position due to action of the motor 94.

The auxiliary component 77 includes a projection 77b projecting inward from an outer circumference vicinity part, and a first inclined wall 77c disposed on substantially the opposite side of the projection 77b. The projection 77b abuts on an elastic stopper 96 disposed in the case 20 (refer to FIG. 2) when the cam wheel 76 reversely rotates, and restricts rotation of the cam wheel 76. The first inclined wall 77c is formed such that the width thereof is increased in the counterclockwise direction from a sleeve surface of the sleeve 77a in a radial direction.

The cam wheel 76 further includes a second inclined wall 76d and a holding wall 76e. The second inclined wall 76d is formed such that the width thereof is increased in the clockwise direction from the sleeve surface of the sleeve 77a in the radial direction. The first inclined wall 77c and the second inclined wall 76d are formed to be opposed to each other at close positions, and are inclined in reverse directions. The first inclined wall 77c is disposed on an outer side as compared with the second inclined wall 76d. The holding wall 76e is a wall having a circular arc shape that is disposed on a side slightly closer to the counterclockwise direction than the second inclined wall 76d, and projects outward along a peripheral surface of the cam wheel 76. As illustrated in FIG. 6, a clockwise direction side of the holding wall 76e is closed, and a counterclockwise direction side thereof is opened.

Returning to FIG. 5, a lower surface 78d of the cam lever 78 abuts on the cam 76b, and when the cam wheel 76 rotates, the cam lever 78 is driven by the cam 76b to swing against a spring 78b in the counterclockwise direction. A knob 78c at a distal end of the cam lever 78 is fitted into a side surface guide groove 80a of the open link 80, and erects the inclined open link 80 when the cam lever 78 swings in the clockwise direction.

The deformed hole 80b is formed at a lower end of the open link 80. The action part 34b of the outer lever 34 (refer to FIG. 4) is inserted into the deformed hole 80b, and the open link 80 is lifted up by an operation of the outer lever 34. The anti-panic lever 58 is assembled to a lower end of the open link 80, and moves up and down, and is inclined integrally with the open link 80.

The open link 80 is a component to be switched to a locked position of an inclined attitude (an attitude in FIG. 5) and an unlocked position of an erected attitude (refer to FIG. 8B) by the cam lever 78. The lock mechanism 46 is caused to be in a locked state when the open link 80 is at the locked position, and the lock mechanism 46 is caused to be in an unlocked state when the open link 80 is at the unlocked position. A position of the open link 80 is switched by the lock lever 86.

That is, when the open link 80 is at the locked position, the anti-panic lever 58 (refer to FIG. 4) does not abut on the ratchet lever 56 (refer to FIG. 4) even in a case of being lifted up by the outer lever 34 because the anti-panic lever 58 is inclined together with the open link 80, that is, an attempt fails. Thus, the ratchet lever 56 does not operate, and the door is kept being closed as the locked state.

On the other hand, when the open link 80 is at the unlocked position and lifted up by the outer lever 34, the anti-panic lever 58 is erected together with the open link 80, so that the anti-panic lever 58 abuts on and pushes up the ratchet lever 56. Thus, the ratchet lever 56 operates to cause the unlocked state in which the door may be opened.

The sub-lock lever 82 is pivotally supported by a shaft part 82a to be able to swing, and is swung and driven by the key lever 90 and the sub-key lever 92 to switch between the locked position and the unlocked position of the open link 80. That is, the sub-lock lever 82 can switch between the locked state and the unlocked state. When the sub-lock lever 82 swings in the counterclockwise direction under action of the key lever 90 and the sub-key lever 92, an upper portion of the open link 80 is pushed out from the sub-lock lever 82 via an inner knob 86i (refer to FIG. 7D of the lock lever 86, and swings in the clockwise direction to be at the unlocked position. When the sub-lock lever 82 swings in the clockwise direction to return to a previous position, elastic force of the spring 78b is transmitted to the open link 80 via the cam lever 78, and the open link 80 swings in the counterclockwise direction to be at the locked position. An arm 98 projecting forward from the shaft part 82a is disposed at an upper part of the sub-lock lever 82. The arm 98 is used as a unit for identifying whether the lock mechanism 46 is in the locked state or the unlocked state, and performs switching operation between a first lock position switch 106 and a second lock position switch 108 (refer to FIG. 3) described later.

The open lever 84 is a component used for opening the door based on electric release, that is, a switch operation and the like performed by a driver. The open lever 84 includes a cam passive part 84b projecting forward and a ratchet operation part 84c projecting rearward, and is energized in the clockwise direction by a spring 84d. When the cam wheel 76 normally rotates, the cam 76b pushes down the cam passive part 84b, the open lever 84 rotates against the spring 84d in the counterclockwise direction about the shaft part 84a, and the ratchet operation part 84c moves upward. When the ratchet operation part 84c moves upward, the passive part 56a of the ratchet lever 56 is pushed up, and the latch mechanism 44 is unlatched to open the door. When the cam wheel 76 returns to the reference position, the open lever 84 is also returned to a reference attitude by the spring 84d.

The open lever 84 can operate the ratchet lever 56 independently of the open link 80. Thus, with the open lever 84, the door can be opened based on the electric release unit even when the lock mechanism 46 is in the locked state (that is, the open link 80 is at the locked position).

As illustrated in FIG. 6, the lock lever 86 is pivotally supported by a shaft part 86a, and includes an arm 86b extending upward, an outer knob 86c projecting outward from a distal end of the arm 86b, a first projection 86e projecting forward from a downward extending part 86d, a second projection 86f projecting forward from the vicinity of the shaft part 86a, a spring reception part 86g projecting outward from the downward extending part 86d, and two push-out parts 86h. The outer knob 86c is fitted into a guide hole 82b formed at a lower end of the sub-lock lever 82. When the sub-lock lever 82 swings, the lock lever 86 is swung by the outer knob 86c. The lock lever 86 can be displaced to an acting position for switching the open link 80 from the locked position to the unlocked position, and a non-acting position at which switching action is not performed on the open link 80. The lock lever 86 is driven by the cam wheel 76 or the sub-lock lever 82.

The spring reception part 86g abuts on a bending part 100a of a spring 100. When the sub-lock lever 82 swings, the spring reception part 86g gets over the bending part 100a while elastically deforming the bending part 100a to be disposed at any one of the locked position and the unlocked position. Accordingly, the sub-lock lever 82 may take any one of the locked attitude illustrated in FIG. 6 and the unlocked attitude (refer to FIG. 8B).

The first projection 86e is pushed out by the first inclined wall 77c. Due to this, the lock lever 86 rotates in the clockwise direction. The second projection 86f is pushed out by the second inclined wall 76d. Due to this, the lock lever 86 rotates in the counterclockwise direction. The second projection 86f can enter a gap between a side surface of the cam wheel 76 and the first inclined wall 77c. The two push-out parts 86h support the auxiliary lever 88 from below.

As illustrated in FIG. 5, the auxiliary lever 88 is pivotally supported by the shaft part 86a similarly to the lock lever 86, and includes an arm 88a projecting forward and a circular arc projection 88b disposed on an upper part of a distal end of the arm 88a. The circular arc projection 88b has a shape that can engage with the holding wall 76e (refer to FIG. 6). The auxiliary lever 88 is energized against the lock lever 86 in the counterclockwise direction by a spring 88c, and a lower surface thereof abuts on the push-out parts 86h to be supported.

Next, the following describes action of the lock mechanism 46.

FIGS. 7A to 7F are diagrams for explaining an operation of the lock mechanism 46 at the time when the cam wheel 76 normally rotates, FIG. 7A is a diagram illustrating a basic state in which the cam wheel 76 is at a reference position, FIG. 7B is a diagram illustrating a state in which the cam wheel 76 normally and slightly rotates from the reference position, FIG. 7C is a diagram illustrating a state in which the cam wheel 76 normally rotates from the reference position by about 40°, FIG. 7D is a diagram illustrating a state in which the cam wheel 76 normally rotates from the reference position by about 90°, FIG. 7E is a diagram illustrating a state in which the cam wheel 76 normally rotates from the reference position by about 190°, and FIG. 7F is a diagram illustrating a state in which the cam wheel 76 normally rotates from the reference position by about 250°. FIGS. 7A to 7F are diagrams of the lock mechanism 46 viewed from the inside, and normal rotation of the cam wheel 76 is the clockwise direction.

The cam wheel 76 normally rotates from the basic state illustrated in FIG. 7A due to action of the motor 94. As illustrated in FIG. 7B, when the cam wheel 76 slightly rotates, the cam 76b abuts on the lower surface 78d of the cam lever 78 and starts to drive the cam lever 78 in the counterclockwise direction. As illustrated in FIG. 7C, when the cam wheel 76 rotates by about 40°, a radius expansion starting part 76ba of the cam 76b abuts on the cam passive part 84b of the open lever 84, and starts to drive the open lever 84 in the counterclockwise direction. As illustrated in FIG. 7D, when the cam wheel 76 rotates by about 90°, a maximum diameter circular arc part 76bb of the cam 76b reaches the lower surface 78d of the cam lever 78, the cam lever 78 is maximally displaced in the counterclockwise direction, and the maximum displacement is maintained thereafter until the state illustrated in FIG. 7F is caused. When the cam lever 78 is maximally displaced, the open link 80 is pushed out by the knob 78c, and swings to be at the unlatched position. However, at this point, the sub-lock lever 82, the lock lever 86, and the auxiliary lever 88 do not operate and maintain attitudes in FIG. 7A.

When the open lever 84 rotates in the counterclockwise direction, the ratchet operation part 84c abuts on and pushes up the passive part 56a of the ratchet lever 56. When the passive part 56a is pushed up, the ratchet lever 56 starts to rotate about an axis.

As illustrated in FIG. 7E, when the cam wheel 76 rotates by about 190°, the open lever 84 is driven in the counterclockwise direction, and the ratchet operation part 84c pushes up the passive part 56a of the ratchet lever 56. Substantially at this point, the open lever 84 starts to act on the ratchet holder 54 (refer to FIG. 4), and an unlatch operation is started.

As illustrated in FIG. 7F, when the cam wheel 76 rotates by about 250°, the maximum diameter circular arc part 76bb of the cam 76b reaches the cam passive part 84b, the open lever 84 is maximally displaced in the counterclockwise direction, the passive part 56a of the ratchet lever 56 is sufficiently pushed up, the latch mechanism 44 unlatches the striker, and the door is opened. Thereafter, by stopping electric supply to the motor 94, the cam wheel 76 rotates in the counterclockwise direction due to action of the spring 76c (refer to FIG. 6), and the lock mechanism 46 returns to the basic state illustrated in FIG. 7A.

At the time of such electric release, as illustrated in FIG. 7A to FIG. 7F, the open lever 84 rotates under the action of the motor 94 to work on the latch mechanism 44, and the striker can be unlatched accordingly. At this point, the open link 80 reciprocates between the locked position and the unlocked position. The open link 80 does not act on the other components, but operates at appropriate time intervals in synchronization with the time of auto-release, so that it is possible to prevent grease from being hardened due to long-term deterioration, or prevent a spring, a lever, and the like made of steel material from rusting. Due to this, the lock mechanism 46 is enabled to smoothly operate in a predetermined situation.

Only the open link 80 operates in synchronization with auto-release, and the lock lever 86 does not operate. Thus, the spring reception part 86g of the lock lever 86 does not get over a bending part 100g, and sound is not generated, so that a sense of incongruity is not given to a user.

Figure 8A:
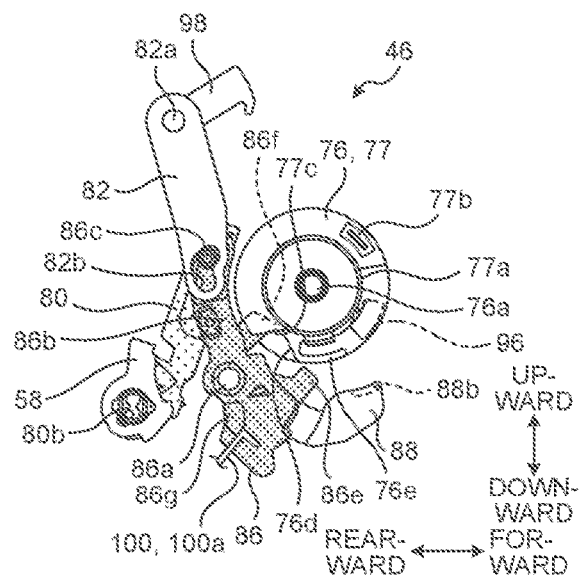
FIG. 8A is a diagram illustrating a basic state in which the cam wheel is at the reference position.
Figure 8B:
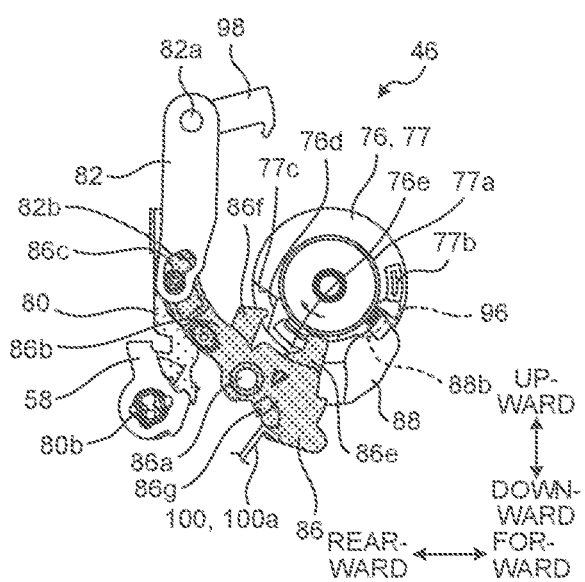
FIG. 8B is a diagram illustrating a state in which the cam wheel reversely rotates from the reference position by about 40°.
Figure 8C:
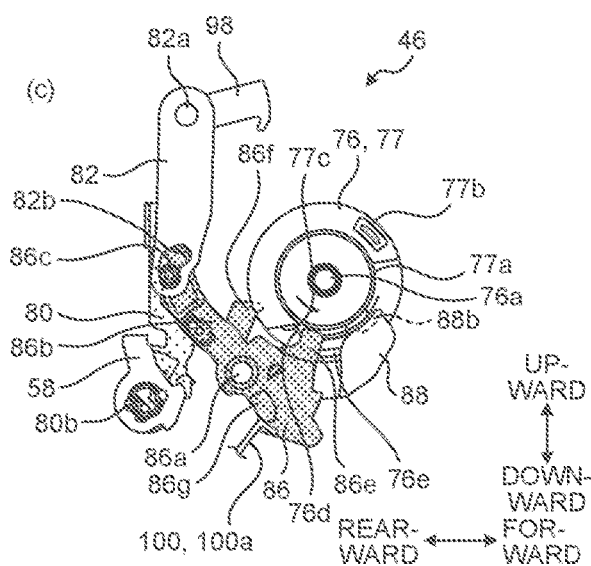
FIG. 8C is a diagram illustrating a state in which the cam wheel normally rotates from the state of FIG. 8B by about 40°.
Figure 8D:
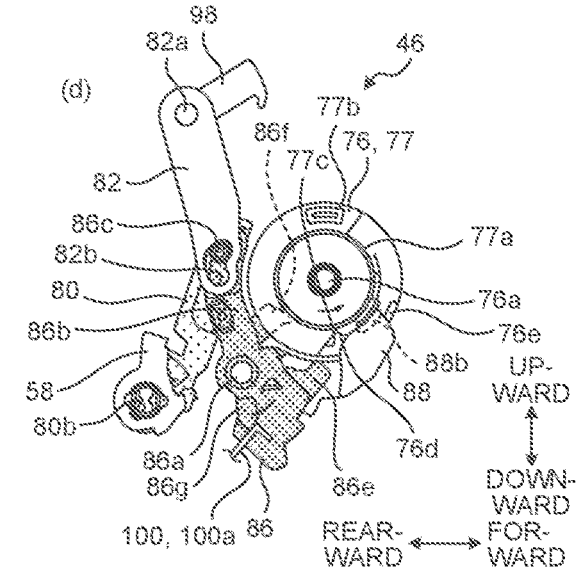
FIG. 8D is a diagram illustrating a state in which the cam wheel normally rotates from the state of FIG. 8C by about 40°.

FIGS. 8A and 8D are diagrams for explaining the operation of the lock mechanism 46 at the time when the cam wheel 76 reversely rotates and normally rotates, FIG. 8A is a diagram illustrating a basic state in which the cam wheel 76 is at the reference position, FIG. 8B is a diagram illustrating a state in which the cam wheel 76 reversely rotates from the reference position by about 40°, FIG. 8C is a diagram illustrating a state in which the cam wheel 76 normally rotates from the state of FIG. 8B by about 40°, and FIG. 8D is a diagram illustrating a state in which the cam wheel 76 normally rotates from the state of FIG. 8C by about 40°. FIGS. 8A to 8D are diagrams of the lock mechanism 46 viewed from the outside, and reverse rotation of the cam wheel 76 is the clockwise direction.

The cam wheel 76 reversely rotates from the basic state illustrated in FIG. 8A due to action of the motor 94. As illustrated in FIG. 8B, when the cam wheel 76 reversely rotates by about 40°, the second inclined wall 76d of the cam wheel 76 presses the second projection 86f. Due to this, the lock lever 86 rotates in the counterclockwise direction, and the spring reception part 86g gets over the bending part 100a of the spring 100 to be displaced to a predetermined inclined position. Following the rotation of the lock lever 86, the sub-lock lever 82 is driven by the outer knob 86c to rotate in the clockwise direction, the open link 80 is driven by the inner knob 86i to rotate in the counterclockwise direction, and the auxiliary lever 88 is driven by the push-out parts 86h (refer to FIG. 5) to rotate in the counterclockwise direction. Due to this, the sub-lock lever 82 and the open link 80 are caused to be at unlocked positions, and the circular arc projection 88b of the auxiliary lever 88 is displaced to a position close to the sleeve 77a.

As illustrated in FIG. 8C, when the cam wheel 76 normally rotates by about 40° from the state of FIG. 8B, the cam wheel 76 returns to the position illustrated in FIG. 8A. However, the spring reception part 86g is held by the bending part 100a, so that the lock lever 86, the sub-lock lever 82, and the open link 80 maintain the attitudes illustrated in FIG. 8B. Due to this, the lock mechanism 46 is caused to be in the unlocked state.

At this point, the circular arc projection 88b starts to engage with an inner diameter side surface of the holding wall 76e of the cam wheel 76, and the auxiliary lever 88 maintains the attitude illustrated in FIG. 8B.

As illustrated in FIG. 8D, when the cam wheel 76 further normally rotates by about 40° from the state of FIG. 8C, the first inclined wall 77c presses the first projection 86e. Due to this, the lock lever 86 rotates in the clockwise direction, and the spring reception part 86g gets over the bending part 100a of the spring 100 to return to the position illustrated in FIG. 8A. Following the rotation of the lock lever 86, the sub-lock lever 82 is driven by the outer knob 86c to rotate in the counterclockwise direction, the open link 80 is driven by the cam lever 78 (refer to FIG. 7) to rotate in the clockwise direction, and both of the sub-lock lever 82 and the open link 80 return to the state illustrated in FIG. 8A.

On the other hand, the circular arc projection 88b engages with the inner diameter side surface of the holding wall 76e of the cam wheel 76, so that the auxiliary lever 88 maintains the attitude illustrated in FIG. 8D. When the cam wheel 76 further normally rotates, an end part on a counterclockwise side of the circular arc projection 88b abuts on a closed surface on the counterclockwise side of the holding wall 76e to restrict rotation. Due to this, the cam wheel 76 can be prevented from excessively rotating. Thereafter, when the cam wheel 76 reversely rotates to the position illustrated in FIG. 8A, engagement between the circular arc projection 88b and the holding wall 76e is released, so that the auxiliary lever 88 rotates in the clockwise direction by elastic force of the spring 88c to return to the position illustrated in FIG. 8A. In this way, the lock mechanism 46 returns to a basic attitude illustrated in FIG. 8A as a whole. As described above, in the door latch device 10, engagement of the latch mechanism 44 can be released, and the locked state and the unlocked state of the lock mechanism 46 can be switched by the single motor 94.

Returning to FIG. 3, the electric components of the door latch device 10 include a latch position switch 102 that detects a rotation state of the latch 12, a key lever position switch 104 that detects a rotation state of the sub-key lever 92, and a first lock position switch 106 and a second lock position switch 108 that detect a rotation state of the sub-lock lever 82 via the arm 98 in addition to the motor 94 described above.

The motor 94, the key lever position switch 104, the first lock position switch 106, and the second lock position switch 108 are collectively disposed in the electric component region 42, but the latch position switch 102 is connected to two terminals 110a and 110b extending from the electric component region 42 so as to be disposed in the vicinity of the latch 12. The terminals 110a and 110b are held by a plate 112.

Figure 9:
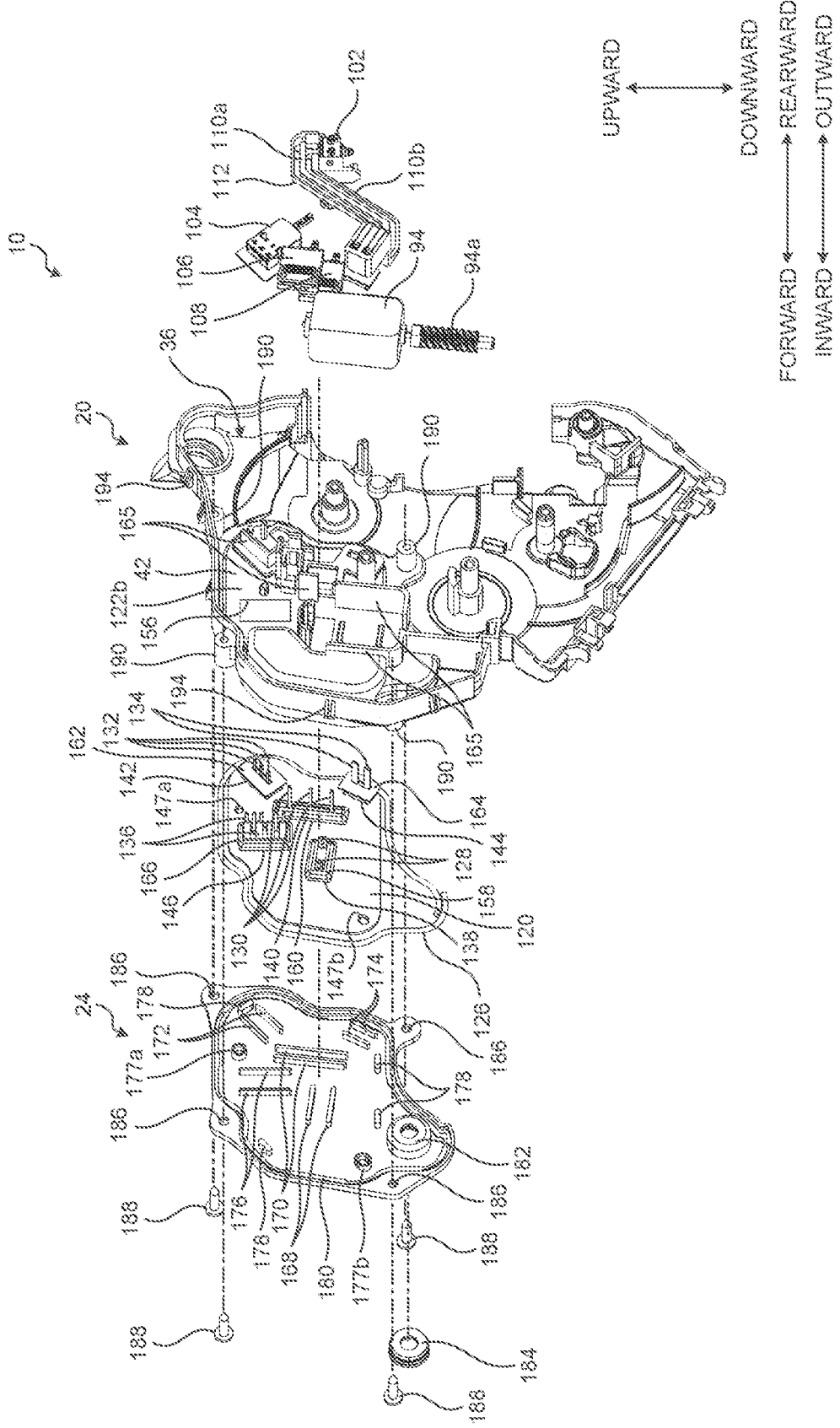
FIG. 9 is an exploded perspective view of electric components, components that house the electric components, and the like viewed from obliquely forward outside.
Figure 10:
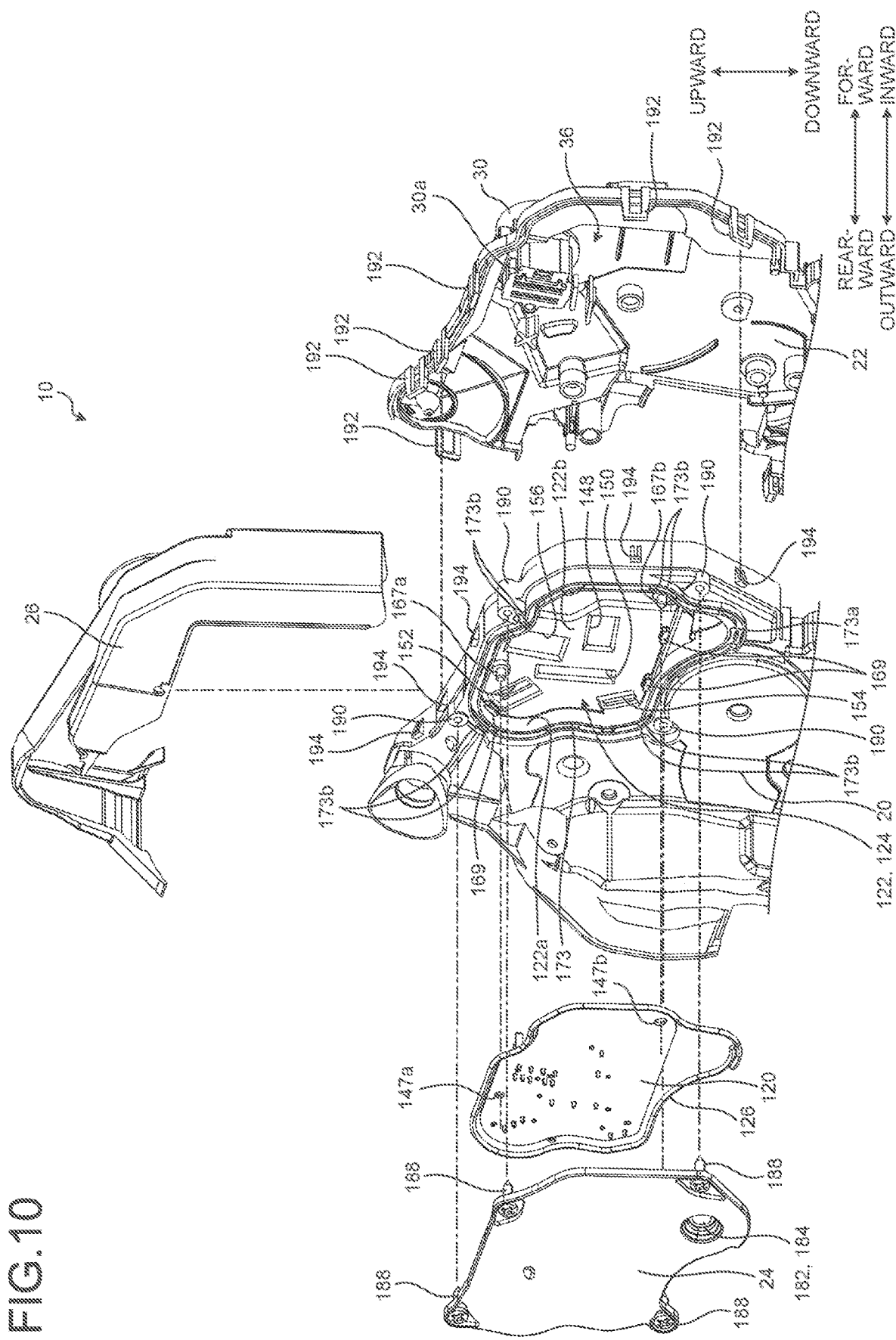
FIG. 10 is an exploded perspective view of electric components, components that house the electric components, and the like viewed from obliquely inside forward.

FIG. 9 is an exploded perspective view of the electric components, components that house the electric components, and the like viewed from obliquely forward outside, and FIG. 10 is an exploded perspective view of the electric components, the components that house the electric components, and the like viewed from obliquely forward inside.

As illustrated in FIG. 9 and FIG. 10, the door latch device 10 includes a circuit board 120 that controls the motor 94. The number of motors controlled by the circuit board 120 may be plural. At an upper part of an outer surface of the case 20, a recessed part 122 is formed in a region corresponding to a back side of the electric component region 42. An outer surface of the recessed part 122 is covered by the second cover 24 described above to form a second housing space 124. The circuit board 120 is housed in the second housing space 124. As described above, the first housing space 36 is partitioned into the mechanism region 40 in which the machine mechanism 38 is disposed, and the electric component region 42 as a remaining region thereof. Thus, the second housing space 124 is disposed on the back side of the electric component region 42 across the case 20. Due to this, the electric components and the like are disposed in a concentrated manner, and a conductive material can be shortened. The electric component region 42 occupies the forward upper part as described above, so that the circuit board 120 disposed on the recessed part 122 of the second housing space 124 is also disposed on the forward upper part based on orientation of the vehicle. The striker entry groove 14 into which waterdrops may penetrate is disposed rearward, so that waterdrops are prevented from reaching the second housing space 124 and the circuit board 120 therein. An external waterproof seal 126 is disposed between an edge of the recessed part 122 and the second cover 24 in the case 20, and the second housing space 124 is waterproofed against the outside. The external waterproof seal 126 is obtained by cutting a string-like sealing material by a predetermined length, and a dedicated molding is not required. The external waterproof seal 126 is disposed such that lower ends thereof are slightly overlapped with each other.

The circuit board 120 includes pins 128, 130, 132, 134, and 136 (hereinafter, also representatively referred to as pins P) erected toward the outside, pin holders 138, 140, 142, 144, and 146 (hereinafter, also representatively referred to as pin holders H) supporting the pins with respect to the circuit board 120 by covering the periphery of bases of the pins P, and two positioning holes 147a and 147b. The pin holder H has appropriate strength, and can presses an internal waterproof seal B (described later). The pin holder H has appropriate elasticity, and exhibits sealing action for the pin P to be inserted. The pin holder H is made of resin, for example, a molding made of polyacetal.

The two pins 128 are connected to the motor 94. The three pins 130 are connected to the first lock position switch 106 and the second lock position switch 108. The three pins 132 are connected to the key lever position switch 104. The two pins 134 are connected to the latch position switch 102 via the terminals 110a and 110b. The several pins 136 project inward from a hole of a terminal wall 30a of the first cover 22 to be part of the coupler 30. In other words, the coupler 30 includes the terminal wall 30a disposed on the first cover 22, and the pins 136 that are erected from the circuit board 120, pass through a pin hole 156 (described later), and project from the hole of the terminal wall 30a. The pin P is soldered on a back surface of the circuit board 120.

The pin holder 138 holds the two pins 128, the pin holder 140 holds the three pins 130 in series, the pin holder 142 holds the three pins 132 in series, the pin holder 144 holds the two pins 134, and the pin holder 146 holds the several pins 136 in two columns.

The positioning hole 147a and the positioning hole 147b are disposed at positions distant from each other. The positioning hole 147a is a round hole, the positioning hole 147b is a long hole directed to the positioning hole 147a, and a manufacturing error of positioning pins 167a and 167b (described later) is allowed. The circuit board 120 further includes a CPU, a memory, resistance, a capacitor, and the like (not illustrated). The circuit board 120 has an irregular shape substantially along the second housing space 124.

The pin holes 148, 150, 152, 154, and 156 (hereinafter, also representatively referred to as pin holes A) are formed on a bottom plate 122b of the recessed part 122 in the case 20. The pin hole A establishes communication between the first housing space 36 and the second housing space 124. The pins 128, 130, 132, 134, and 136 respectively project from the pin holes 148, 150, 152, 154, and 156 in order toward the first housing space 36, and are inserted into pin connection holes disposed on the respective electric components to be electrically connected. Each of the electric components is held by a holding wall 165 disposed on the outer surface of the case 20. Between outer peripheries of the pin holders 138, 140, 142, 144, and 146 and the pin holes 148, 150, 152, 154, and 156, rectangular internal waterproof seals 158, 160, 162, 164, and 166 having a ring shape (hereinafter, also representatively referred to as internal waterproof seals B) are disposed in order. The internal waterproof seal B waterproofs a space between the first housing space 36 and the second housing space 124. The second housing space 124 is waterproofed by the external waterproof seal 126 and the internal waterproof seal B, and suitable for housing the circuit board 120. The internal waterproof seal B preferably has a rectangular ring shape corresponding to the corresponding pin hole A, but parts of a non-ring-shaped body may be overlapped to be used like the external waterproof seal 126 depending on a condition. The circuit board 120 is disposed on an upper part than the striker entry groove 14 (refer to FIG. 3). Specifically, a lower part of the circuit board 120 has a horizontal linear shape, and this portion is disposed on an upper part than an upper end of the striker entry groove 14. Even if the external waterproof seal 126 and the internal waterproof seal B are not disposed, waterdrops entered through the striker entry groove 14 are prevented from reaching the circuit board 120.

Two positioning pins 167a and 167b, and a plurality of inner circuit board supporters (first circuit board supporters) 169 are further formed on the bottom plate 122b. The positioning pins 167a and 167b are inserted into the positioning holes 147a and 147b, and the circuit board 120 is positioned. The inner circuit board supporter 169 is disposed at a position along the periphery of the circuit board 120, and abuts on an inner surface of the circuit board 120.

A seal groove 173 is formed along an outer circumference of a surrounding wall 122a surrounding the recessed part 122. The external waterproof seal 126 is disposed on the seal groove 173. An overlap groove 173a for causing lower ends of the external waterproof seal 126 to be overlapped and disposed is formed in the seal groove 173. Projection pairs 173b projecting from both sides in an opposed manner are formed at a plurality of points including a bending point in the seal groove 173. The projection pairs 173b are stoppers for the external waterproof seal 126. An entire circumference between the recessed part 122 and the second cover 24 is waterproofed by the external waterproof seal 126.

Pairs of support projections 168, 170, 172, 174, and 176 (hereinafter, also representatively referred to as support projections C) are formed on an inner surface of the second cover 24. The support projections 168, 170, 172, 174, and 176 are disposed at positions opposed to the pin holders 138, 140, 142, 144, and 146 in order across the circuit board 120. The support projection C supports a back side of an abutting part of the pin holder H in the circuit board 120. The support projection C and a leg part Hd (described later) are disposed on both sides across the pin P in a longitudinal direction of the pin holder H.

On the inner surface of the second cover 24, two positioning posts 177a and 177b, a plurality of outer circuit board supporters (second circuit board supporters) 178, a seal pressing projection 180, and an osmosis membrane holder 182 are further formed. A round hole is formed on the positioning post 177a, and a long hole directed to the positioning post 177a is formed on the positioning post 177b. The positioning pins 167a and 167b passed through the positioning holes 147a and 147b are inserted into respective holes of the positioning posts 177a and 177b, and the second cover 24 is positioned.

The outer circuit board supporter 178 is disposed at a position along the periphery of the circuit board 120 and a position opposed to the inner circuit board supporter 169 via the circuit board 120, and sandwiches and holds the circuit board 120 between itself and the inner circuit board supporter 169. The inner circuit board supporter 169 and the outer circuit board supporter 178 are disposed to be opposed to each other, and to have the same cross-sectional shape and the same orientation.

The seal pressing projection 180 is a narrow projection having a substantially ring shape along the seal groove 173, and presses an outer surface of the external waterproof seal 126. The external waterproof seal 126 exhibits sealing action by being pressed to be sealed by the seal pressing projection 180.

The osmosis membrane holder 182 is a cylindrical body projecting outward, and has a hole 182a at a distal end thereof. An osmosis membrane filter 184 is attached to the osmosis membrane holder 182 from inside. The osmosis membrane filter 184 can prevent passage of waterdrops and cause water vapor to pass through the hole 182a, and prevents the second housing space 124 from being caused to be in a high humidity state. The osmosis membrane holder 182 and the osmosis membrane filter 184 are disposed in a space under the circuit board 120 in the second housing space 124. The osmosis membrane holder 182 is disposed in a range surrounded by an abutting part of the external waterproof seal 126 on the second cover 24.

A plurality of screw holes 186 are disposed on the periphery of the second cover 24, and when screws 188 passed through the screw holes 186 are screwed to screw posts 190 disposed on the case 20, the second cover 24 is fixed to the case 20.

A plurality of hooks 192 are disposed on the periphery of the first cover 22, and when the hook 192 engages with a pawl 194 disposed on the case 20, the first cover 22 is fixed to the case 20. After the first cover 22 and the second cover 24 are attached to the case 20, the waterproof cover 26 is attached thereto from above. With the waterproof cover 26, even if the external waterproof seal 126 and the internal waterproof seal B are not disposed, waterdrops from above can be fairly prevented from reaching the circuit board 120 within the second housing space 124 covered by the second cover 24.

The first housing space 36 formed between the case 20 and the first cover 22 is not completely waterproofed, and has what is called a dripproof structure. This is because that the dripproof structure is sufficient for each component housed in the first housing space 36. On the other hand, as described above, the second housing space 124 has a waterproof structure due to the external waterproof seal 126 and the internal waterproof seal B because precision electronic component and the like are mounted on the circuit board 120.

Next, the following further describes the waterproof structure of the second housing space 124.

Figure 11A:
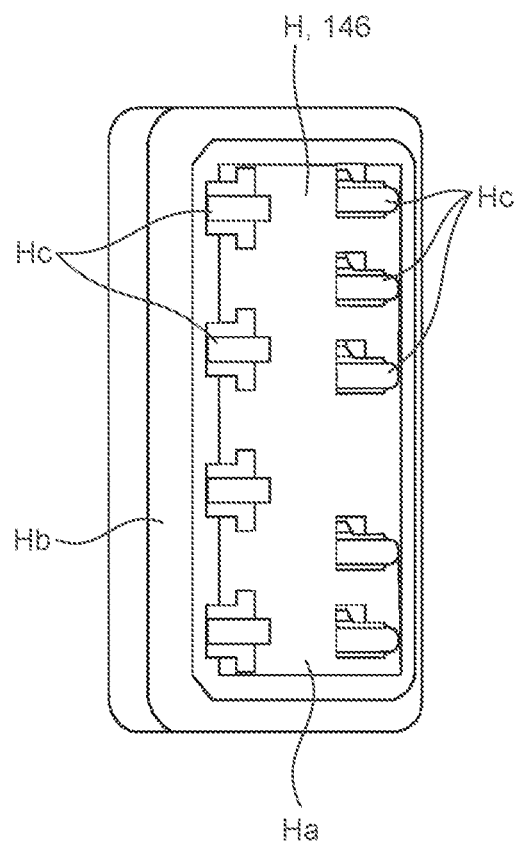
FIG. 11A is a perspective view thereof viewed from obliquely inward.
Figure 11B:
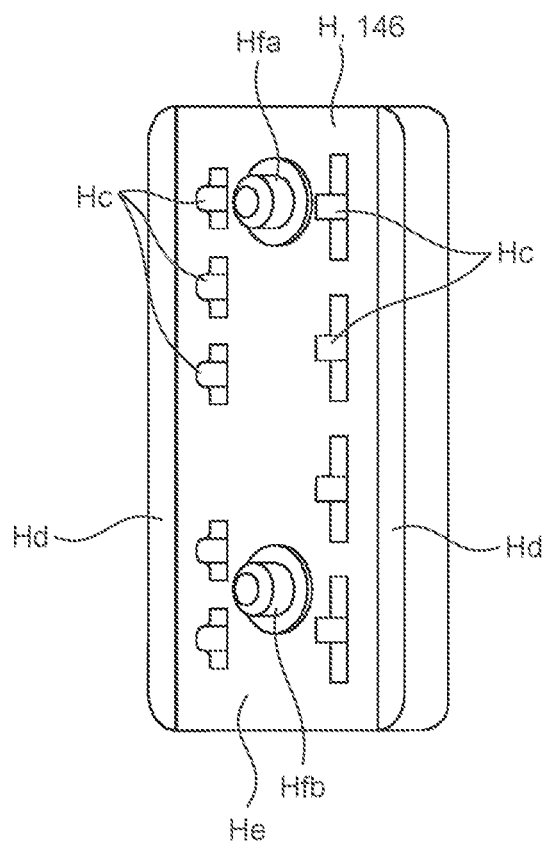
FIG. 11B is a perspective view thereof viewed from obliquely outward.

FIGS. 11A and 11B are diagrams illustrating a pin holder H, FIG. 11A is a perspective view thereof viewed from obliquely inward, and FIG. 11B is a perspective view thereof viewed from obliquely outward. FIG. 11 exemplifies the pin holder 146.

As illustrated in FIG. 11A, the pin holder H has a rectangular shape having four round corners. An inner surface Ha of the pin holder H is a plane, and an inclined surface Hb is formed around the inner surface Ha. The inner surface Ha and the inclined surface Hb are smooth. Holes Hc into which corresponding pins P (refer to FIG. 12) are respectively inserted are formed on the pin holder H. The holes Hc are formed corresponding to the number and shapes of pins P, and exhibit sealing action with respect to the pins P.

As illustrated in FIG. 11B, on an outer surface of the pin holder H, a pair of leg parts Hd is formed in the longitudinal direction on both sides in the lateral direction. A space between the pair of leg parts Hd is a recessed part He that is slightly recessed. The hole Hc opens at the recessed part He. On the recessed part He, two positioning projections, that is, a positioning projection Hfa and a positioning projection Hfb that are slightly distant from each other in the longitudinal direction are disposed.

Figure 12:
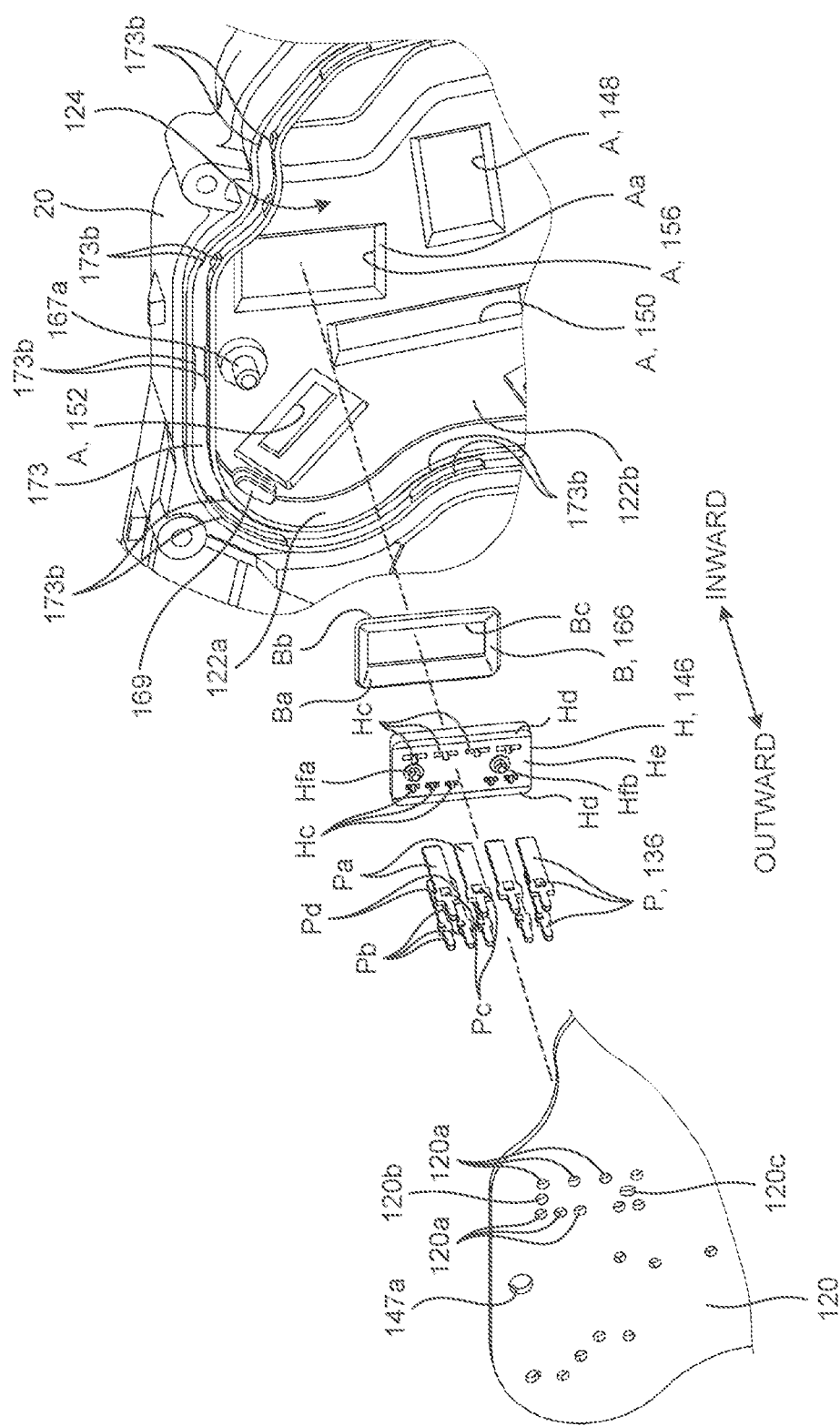
FIG. 12 is an exploded perspective view of a circuit board, a pin holder, a pin, an internal waterproof seal, and a case.

FIG. 12 is an exploded perspective view of the circuit board 120, the pin holder H, the pin P, the internal waterproof seal B, and the case 20. FIG. 12 exemplifies the pin holder 146 and portions related thereto.

As illustrated in FIG. 12, each of the pins P includes a main part Pa that projects from the pin hole A and is electrically connected to an electric component, a solder leg Pb that passes through a component hole 120a of the circuit board 120 to be soldered, a wedge part Pc as a portion that is inserted into the hole Hc of the pin holder H to be engaged with the hole Hc, and a stopper Pd that restricts an insertion depth with respect to the hole Hc. A pair of the stoppers Pd is disposed for each pin P. The pin P may be directly connected to a connection port of the electric component (refer to the motor 94 in FIG. 13 and the key lever position switch 104 in FIG. 15), or may be indirectly connected thereto via an electric conductor (refer to the latch position switch 102 in FIG. 9).

The circuit board 120 includes the component hole 120a described above, a positioning hole 120b into which the positioning projection Hfa is inserted, and a positioning hole 120c into which the positioning projection Hfb is inserted. The positioning hole 120b is a round hole. The positioning hole 120c is a long hole directed to the positioning hole 120b, and can allow a manufacturing error of the positioning projection Hfa and the positioning projection Hfb.

The internal waterproof seal B is a component to cover the inclined surface Hb (refer to FIG. 11A of the pin holder H, and has a rectangular pyramid shape corresponding to inclination of the inclined surface Hb. The internal waterproof seal B has an outer surface Ba that abuts on the inclined surface Hb, an inner surface Bb that abuts on the pin hole A, and a rectangular hole Bc.

The pin hole A is a rectangular hole through which the pin P projects, and includes an inclined surface Aa that becomes narrower toward the inside. The inclined surface Aa is formed to be smooth. An opening of the pin hole A is set to be larger than the rectangular hole Bc of the internal waterproof seal B. The inclined surface Aa, the outer surface Ba and the inner surface Bb of the internal waterproof seal B, and the inclined surface Hb of the pin holder H have the same inclination.

At the time of attaching the pins P to the circuit board 120, first, each of the pins P is inserted into the hole Hc of the corresponding pin holder H from the outer surface. The pin P is inserted into an appropriate depth with the stopper Pd, and locked by the wedge part Pc.

Next, the pin holder H into which the pin P is inserted is temporarily disposed at a predetermined point on the circuit board 120. The pin holder H is correctly positioned when the positioning projections Hfa and Hfb are respectively inserted into the positioning holes 120b and 120c. By using the pin holder H, each solder leg Pb of the pins P is correctly and easily inserted into the component hole 120a. It is more efficient that the pins P are inserted into the pin holder H as preparation at a different step as compared with a case of directly soldering the pin P to the circuit board 120 one by one.

After all of a plurality of the pin holders H are temporarily disposed at predetermined points, a portion of the solder leg Pb projecting toward the outer surface side of the circuit board 120 is soldered. Due to this, each pin P is fixed to the circuit board 120 together with the pin holder H.

The circuit board 120 is housed in the second housing space 124 after the pin P, the pin holder H, the electronic components, and the like are implemented thereon. At this point, the internal waterproof seal B is disposed between the pin holder H and the pin hole A. Additionally, as illustrated in FIG. 10, after the external waterproof seal 126 is disposed in the seal groove 173, the second cover 24 is attached to the case 20 with the screws 188.

Figure 13:
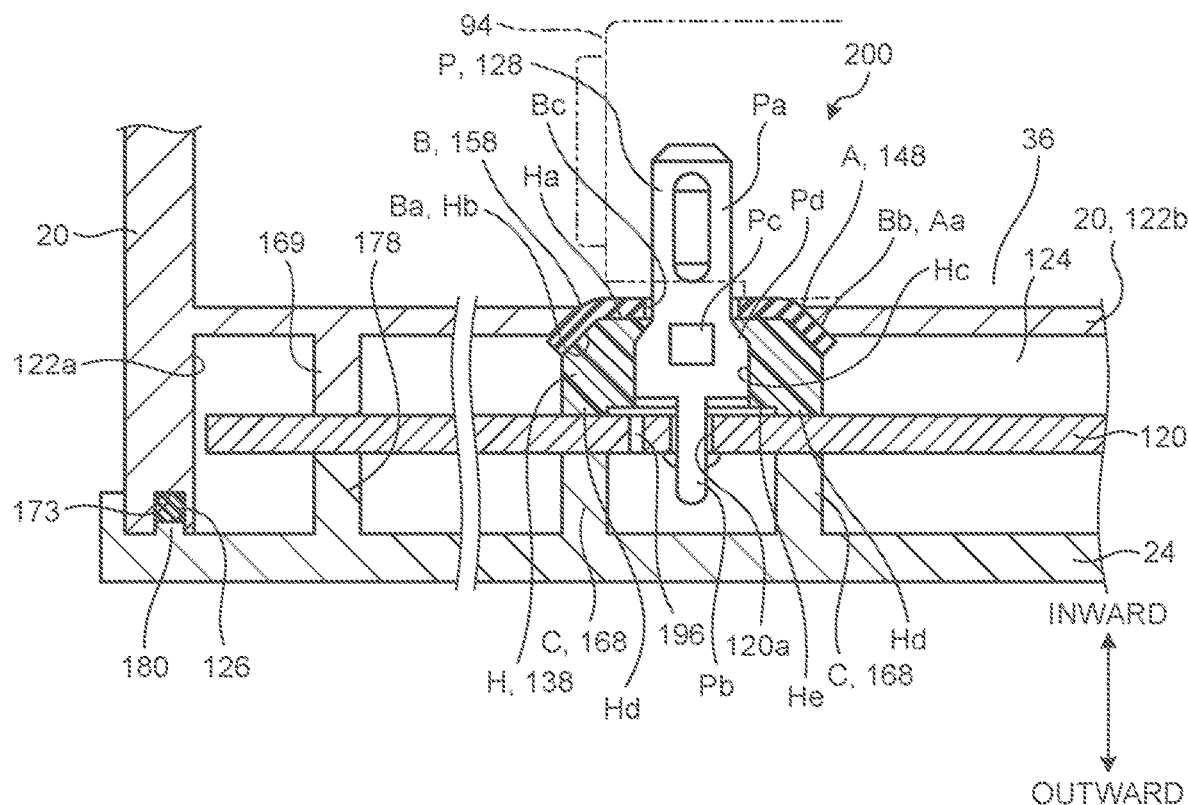
FIG. 13 is a partial cross-sectional side view of the pin holder and the periphery thereof viewed from a longitudinal direction of the pin holder.
Figure 14:
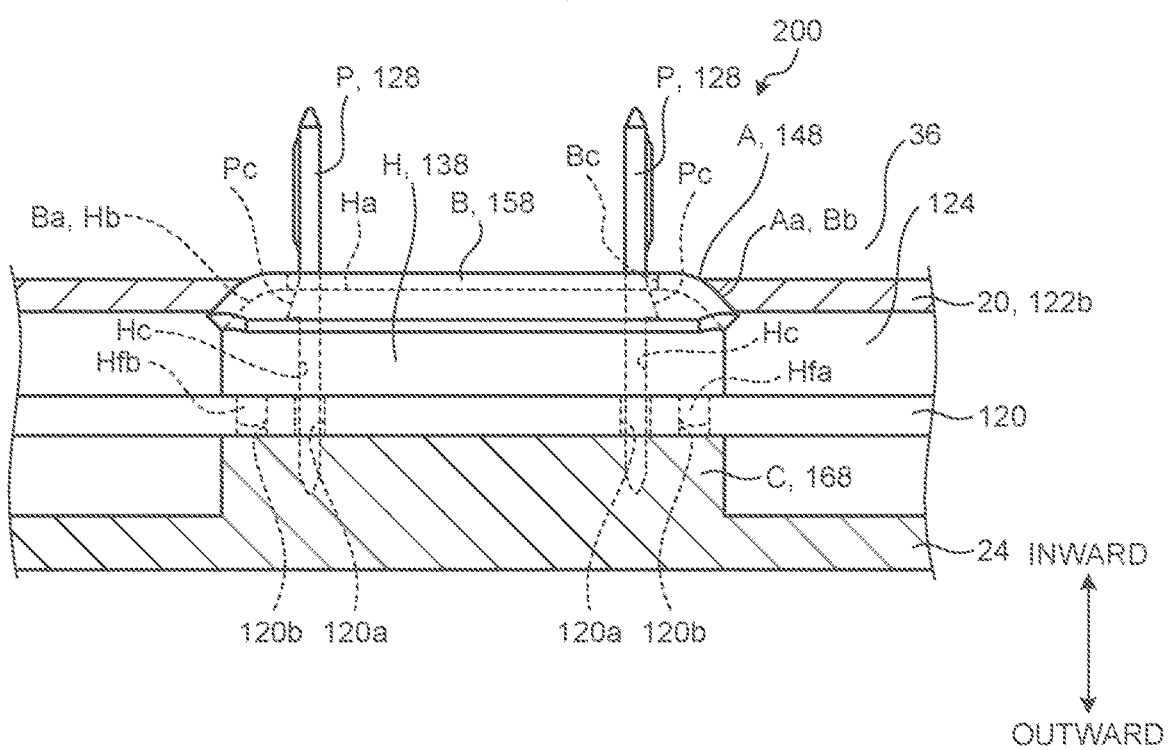
FIG. 14 is a partial cross-sectional side view of the pin holder and the periphery thereof viewed from a lateral direction of the pin holder.

FIG. 13 is a partial cross-sectional side view of the pin holder H and the periphery thereof viewed from the longitudinal direction of the pin holder H, and FIG. 14 is a partial cross-sectional side view of the pin holder H and the periphery thereof viewed from the lateral direction of the pin holder H. FIG. 13 and FIG. 14 exemplify the pin holder 138 and portions related thereto.

As illustrated in FIG. 13, when the second cover 24 is attached to the case 20 after the circuit board 120 is housed in the second housing space 124, the external waterproof seal 126 is compressed and deformed by being appropriately pressed by the seal groove 173 and the seal pressing projection 180 to exhibit sealing action, and waterproofs the second housing space 124 against the outside. The circuit board 120 is sandwiched by the inner circuit board supporter 169 and the outer circuit board supporter 178 to be stabilized.

As illustrated in FIG. 13 and FIG. 14, when the second cover 24 is attached to the case 20, the second cover 24 presses the pin holder H and the internal waterproof seal B inward via the support projection C and the circuit board 120. The internal waterproof seal B is sandwiched by the inclined surface Aa of the pin hole A and the inclined surface Hb of the pin holder H at an appropriately wide area, and is compressed and deformed by being appropriately pressed to exhibit sealing action. In the internal waterproof seal B, the inner surface Bb exhibits sealing action with respect to the inclined surface Aa, and the outer surface Ba exhibits sealing action with respect to the inclined surface Hb.

The pin P, the pin holder H, the pin hole A, and the internal waterproof seal B form an internal waterproof structure 200. The internal waterproof structure 200 waterproofs a space between the second housing space 124 and the first housing space 36. That is, the sealing action between the inner surface Bb and the inclined surface Aa prevents water from entering the second housing space 124 through the rectangular hole Bc. Due to the sealing action between the hole Hc of the pin holder H and the pin P, water is prevented from running through the surface of the pin P to enter the surface of the circuit board 120. In this way, in the door latch device 10, the entire second housing space 124 is waterproofed, and the entire surface of the circuit board 120 is waterproofed.

The internal waterproof structure 200 also has a function of stably holding the circuit board 120. Specifically, a plurality of the internal waterproof structures 200 are disposed to be appropriately distributed, so that the circuit board 120 is stabilized.

The internal waterproof seal B projects slightly inward as compared with the pin hole A, and an end face thereof can abut on the electric component. Specifically, the motor 94 has relatively heavy weight among the electric components, but can reduce force applied to the pin P by abutting on the end face of the internal waterproof seal B. The internal waterproof seal B has elasticity, and is appropriate for supporting the electric component.

The pin holder H has some kinds of action. That is, the pin holder H has action of holding the pins P to be collectively inserted into component holes 120a of the circuit board 120, action of holding the pin P inserted into the component hole 120a in an erected state, action of receiving force from the support projection C by the leg part Hd and transmitting the force to the internal waterproof seal B to compress the internal waterproof seal B to achieve waterproofing with respect to the pin hole A, action of waterproofing a space between the inclined surface Hb and the outer surface Ba, and action of supporting the pin P and the electric component in an auxiliary manner at the time when the electric component is connected to the main part Pa of the pin P. Gravity and vibration applied to the pin P from the electric component is received, absorbed, and distributed by the pin holder H, and external force applied to the soldered portion can be suppressed. Thus, it is sufficient that the pin P is electrically connected to the electric component, and mechanical strength for supporting the electric component may be small. Due to this, for example, a base part of the pin P is not required to have a complicated shape like the pin disclosed in Japanese Patent No. 6482537, and may have a simple narrow shape, so that cost can be reduced and an area of the circuit board 120 can be effectively used.

The pair of support projections C is opposed to the pair of leg parts Hd across the circuit board 120, so that the pin holder H can be securely pressed inward. Specifically, the pair of support projections C and the pair of leg parts Hd are disposed to have the same cross-sectional shape and the same orientation, so that the pair of support projections C and the pair of leg parts Hd are disposed to be overlapped with each other in a plan view. Accordingly, wasteful force is not applied to the other portion of the circuit board 120, and bending deformation of the circuit board 120 and the like can be prevented, for example. The same applies to a relation between the inner circuit board supporter 169 and the outer circuit board supporter 178 described above. A plan view of the support projection C and the leg part Hd is omitted, but it can be obviously found that the support projection C and the leg part Hd overlap with each other in a plan view from FIG. 13 and FIG. 14.

The support projection C and the leg part Hd are formed in the longitudinal direction of the pin holder H, so that pressing force is distributed as an appropriately wide area is secured, and the support projection C and the leg part Hd are stabilized because of their appropriate length. The support projection C and the leg part Hd are balanced because they are disposed on both sides across the pin P. However, the support projection C and the leg part Hd may be disposed on only one side with respect to the pin P if a condition such that a certain area is secured is satisfied. The outer side of the circuit board 120 is supported by the outer circuit board supporter 178, so that the support projection C may be omitted depending on a condition.

The recessed part He is formed between the pair of leg parts Hd, so that a gap is secured between the recessed part He and the surface of the circuit board 120. A through hole 196, a pattern (not illustrated), and a land can be disposed in a gap facing the recessed part He in the circuit board 120, and a dead area of the surface of the circuit board 120 is reduced.

Figure 15:
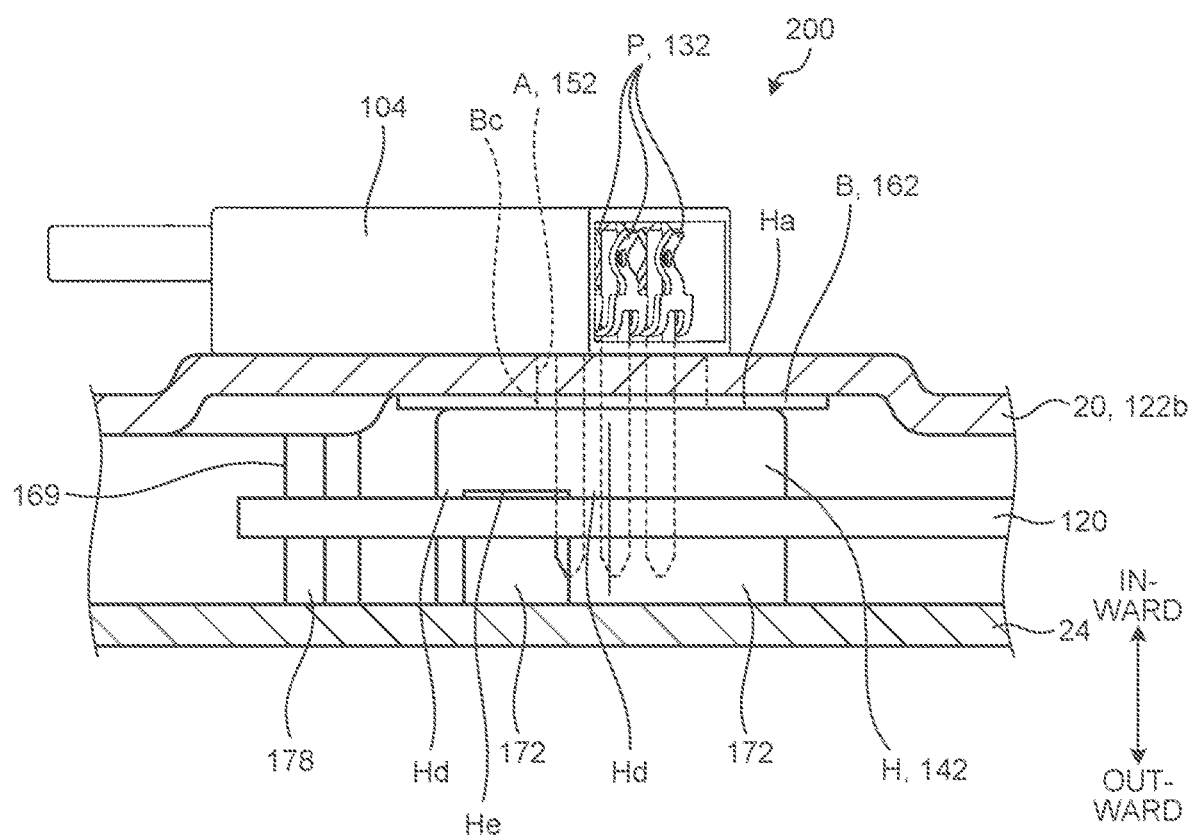
FIG. 15 is a partial cross-sectional side view of the pin holder and the periphery thereof different from FIG. 13 and FIG. 14.

FIG. 15 is a partial cross-sectional side view of the pin holder H and the periphery thereof different from FIG. 13 and FIG. 14. FIG. 15 exemplifies the pin holder 142 and portions related thereto.

The pin holder 138 illustrated in FIG. 13 and FIG. 14 includes the inclined surface Hb, and the corresponding pin hole A and internal waterproof seal B have the inclined surfaces. On the other hand, the pin holder 142 illustrated in FIG. 15 has a substantially box shape without the inclined surface Hb, the corresponding internal waterproof seal 162 has a flat plate shape without an inclined surface, and the corresponding pin hole 152 is a rectangular hole without the inclined surface Aa.

In this case, the internal waterproof seal 162 is pressed by the inner surface Ha of the pin holder 142 and a peripheral part of the pin hole 152 on the bottom plate 122b to exhibit sealing action. The pin holder 142 and the internal waterproof seal 162 in this case have a simple shape, and can be easily manufactured.

The internal waterproof seal B and the pin holder H may be integrated with each other by a joining unit such as bonding or welding. Due to this, positioning of the internal waterproof seal B becomes unnecessary, and assembly is facilitated. When the internal waterproof seal B and the pin holder H are bonded to each other, a space therebetween is completely waterproofed. Additionally, the internal waterproof seal B and the pin holder H may be an integrated molding made of the same material. Due to this, the number of components can be reduced.

The present disclosure is not limited to the embodiment described above, and can be freely modified without departing from the gist of the present disclosure, obviously.

In the door latch device according to an embodiment, a waterproof property can be improved.

According to an embodiment, the first housing space in which the machine mechanism is housed is distinguished from the second housing space in which the circuit board is housed, and waterproof structures appropriate for the respective spaces can be employed. The second housing space is formed in an appropriate shape with the recessed part and the second cover, and the entire circumference thereof is waterproofed by the external waterproof seal to improve a waterproof property.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A door latch device that is disposed on a door of a vehicle, and is configured to latch and unlatch a striker disposed on a main body side of the vehicle to close and open the door, the door latch device comprising:
    electric components including a motor;
    a machine mechanism configured to be driven by the motor;
    a circuit board electrically connected to the electric components;
    a case;
    a first cover forming a first housing space in which the motor and the machine mechanism are housed by covering one surface of the case;
    a second cover forming a second housing space in which the circuit board is housed by covering another surface of the case; and
    an external waterproof seal that is disposed between the case and the second cover, and waterproofs the second housing space against outside,
    wherein the case includes:
        a recessed part forming a part of the second housing space;
        a surrounding wall surrounding the recessed part; and
        a seal groove formed along an outer circumference of the surrounding wall and in which the external waterproof seal is disposed,
    wherein the second housing space is formed by covering the recessed part by the second cover,
    wherein an entire circumference between the recessed part and the second cover is waterproofed by the external waterproof seal, and
    wherein the door latch device further includes:
        a pin hole that is disposed in the case to establish communication between the first housing space and the second housing space;
        a pin that is erected from the circuit board to project into the first housing space through the pin hole;
        a pin holder that is fitted into the pin hole to support the pin with respect to the circuit board by covering a periphery of a base of the pin; and
        an internal waterproof seal that is fitted into the pin hole so that the internal waterproof seal is disposed between the pin hole and the pin holder fitted into the pin hole, and waterproofs a space between the first housing space and the second housing space.

2. The door latch device according to claim 1, wherein the second cover includes a seal pressing projection that presses the external waterproof seal.

3. The door latch device according to claim 1, wherein an osmosis membrane holder to which an osmosis membrane filter is attached is disposed in a range surrounded by an abutting part of the external waterproof seal on the second cover.

4. The door latch device according to claim 3, wherein the osmosis membrane holder and the osmosis membrane filter are disposed in a space under the circuit board in the second housing space.

5. The door latch device according to claim 1, comprising:
    a pin hole that is disposed in the case to establish communication between the first housing space and the second housing space; and
    a coupler to which a harness connector is connected, wherein
    the coupler includes:
        a terminal wall disposed on the first cover; and
        a pin that is erected from the circuit board to project from a hole of the terminal wall through the pin hole.

6. The door latch device according to claim 1, wherein the circuit board housed in the second housing space is disposed on an upper part of the case that is above a striker entry groove that the striker enters, and a waterproof cover is provided, which covers a boundary part between the case and the first cover, and the second cover from above.

7. The door latch device according to claim 1, wherein the first housing space is partitioned into a mechanism region in which the machine mechanism is disposed, and a remaining region which is a region other than the mechanism region of the first housing space, and the second housing space is disposed on a back side of the remaining region across the case.

8. The door latch device according to claim 1, wherein the second housing space is disposed on a forward upper part when an orientation of the vehicle is regarded as a reference.

9. The door latch device according to claim 1, wherein an overlap groove for causing lower ends of the external waterproof seal to be overlapped and disposed is formed in the seal groove.

10. The door latch device according to claim 1, wherein projection pairs projecting from opposing sides of the seal groove are formed at a plurality of points in the seal groove.

11. The door latch device according to claim 1, wherein the internal waterproof seal and the pin holder are an integrated molding made of a same material.

12. The door latch device according to claim 1, wherein the internal waterproof seal and the pin holder are integrated with each other by a joining unit including bonding and welding.

13. The door latch device according to claim 1, wherein the internal waterproof seal is disposed to cover a periphery of the pin and overlap the pin holder.

* * * * *